US012682162B2

(12) United States Patent
Huang et al.

(10) Patent No.: US 12,682,162 B2
(45) Date of Patent: Jul. 14, 2026

(54) METHOD AND APPARATUS FOR SEQUENCE PROCESSING

(71) Applicant: HUAWEI TECHNOLOGIES CO., LTD., Shenzhen (CN)

(72) Inventors: Wenyong Huang, Shenzhen (CN); Yu Ting Yeung, Hong Kong (CN); Xiao Chen, Hong Kong (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 766 days.

(21) Appl. No.: 17/994,068

(22) Filed: Nov. 25, 2022

(65) Prior Publication Data

US 2023/0088915 A1      Mar. 23, 2023

Related U.S. Application Data

(63) Continuation of application No. PCT/CN2021/073868, filed on Jan. 27, 2021.

(30) Foreign Application Priority Data

May 26, 2020     (CN) .......................... 202010454695.6

(51) Int. Cl.
 *G06F 40/205* (2020.01)
 *G06F 40/279* (2020.01)
 *G06N 3/02* (2006.01)
(52) U.S. Cl.
 CPC .......... *G06F 40/205* (2020.01); *G06F 40/279* (2020.01); *G06N 3/02* (2013.01)

(58) Field of Classification Search
 CPC ...... G06F 40/205; G06F 40/279; G06F 40/30; G06F 40/289; G06N 3/02; G06N 3/044;
(Continued)

(56) References Cited

U.S. PATENT DOCUMENTS

2021/0141798 A1* 5/2021 Steedman Henderson .................. G06F 16/3344
2021/0390410 A1* 12/2021 Vaswani ................ G06V 10/82

FOREIGN PATENT DOCUMENTS

CN           111783446 A     10/2020

OTHER PUBLICATIONS

Roy, Aurko, et al. "Efficient content-based sparse attention with routing transformers." Transactions of the Association for Computational Linguistics 9 (2021): 53-68. (Year: 2021).*
(Continued)

*Primary Examiner* — Francisco A Grullon

(57) ABSTRACT
This application provides a method and apparatus for sequence processing, relates to the field of artificial intelligence, and specifically relates to the field of sequence data processing. The method includes: receiving an input sequence; performing self-attention calculation on a first element in the input sequence by using an element included in M windows, to obtain a representation of the first element, where each window includes one element or a plurality of consecutive elements in the input sequence, there is an interval of at least one element between different windows, at least one of the M windows does not include the first element, and M is an integer greater than or equal to 1; and obtaining, based on the representation of the first element, an output sequence corresponding to the input sequence.

20 Claims, 14 Drawing Sheets

(58) Field of Classification Search
CPC ...... G06N 3/0464; G06N 3/048; G06N 3/045;
G06N 3/08
See application file for complete search history.

(56) References Cited

OTHER PUBLICATIONS

PCT International Search Report for Application No. PCT/CN2021/073868 dated Jan. 27, 2021, 12 pages.

* cited by examiner

He    proposed    the    famous    special    theory    of    relativity    at the age of 26

He    proposed    the    famous    special    theory    of    relativity    at the age of 26

Sequence
processing result

Another neural network layer

Sequence processor

Self-attention layer

Another neural network layer

To-be-processed sequence

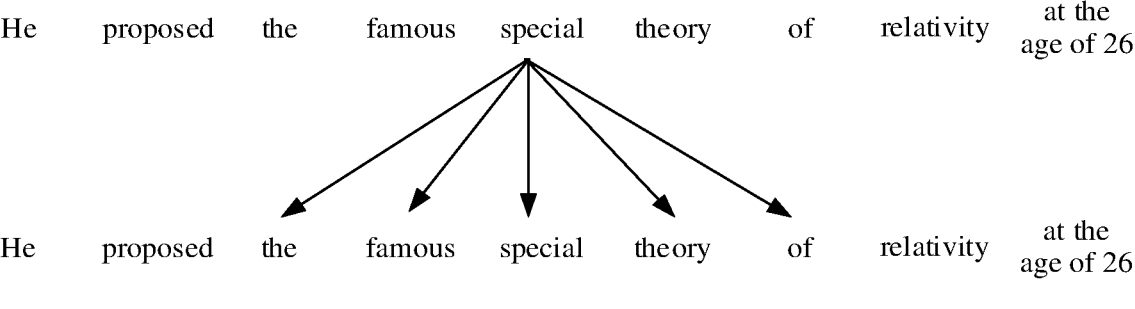

FIG. 3

| S410: Receive an input sequence |
| --- |

| S420: Perform self-attention calculation on a first element in the input sequence by using an element included in M windows, to obtain a representation of the first element, where each includes one element or a plurality of consecutive elements in the input sequence, there is an interval of at least one element between different windows, at least one of the M windows does not include the first element, and M is an integer greater than or equal to 1 |
| --- |

| S430: Obtain, based on the representation of the first element, an output sequence corresponding to the input sequence |
| --- |

METHOD AND APPARATUS FOR SEQUENCE PROCESSING

CROSS-REFERENCE TO RELATED APPLICATIONS

This application is a continuation of International Application No. PCT/CN2021/073868, filed on Jan. 27, 2021, which claims priority to Chinese Patent Application No. 202010454695.6, filed on May 26, 2020. The disclosures of the aforementioned applications are hereby incorporated by reference in their entireties.

TECHNICAL FIELD

This application relates to the artificial intelligence field, and specifically, to a method and an apparatus for sequence processing.

BACKGROUND

Many issues about speech processing and natural language processing (NLP) may be considered as sequence processing issues. A sequence includes several elements in order. For example, speech data may be represented as a sequence in which a sampling point is an element. For another example, text data may be represented as a sequence in which a word is an element. A meaning of an element in a sequence is usually related to another element in the sequence. How to model a relationship between elements in a sequence is the key to a sequence processing issue. Currently, methods for modeling a relationship between elements in a sequence include a recurrent neural network (RNN), a convolutional neural network (CNN), and self-attention. Self-attention is a method for obtaining a representation of an element in a sequence by establishing a relationship between the element and another element in the sequence.

A conventional self-attention method is as follows: For an element, a relationship between the element and all elements in a sequence is established. This leads to a large self-attention calculation amount. To reduce a self-attention calculation amount, a solution proposed in a current technology is as follows: For an element, several elements near the element are fixedly used for self-attention calculation. However, this solution causes a problem that a self-attention dependency range is limited.

How to balance a self-attention calculation amount and a self-attention dependency range is an issue that needs to be addressed.

SUMMARY

This application provides a method and an apparatus for sequence processing, to well balance a self-attention calculation amount and a self-attention dependency range.

According to a first aspect, a method for sequence processing is provided. The method includes: receiving an input sequence, where the input sequence includes a plurality of elements in order; performing self-attention calculation on a first element in the input sequence by using an element included in M windows, to obtain a representation of the first element, where each of the M windows includes one element or a plurality of consecutive elements in the input sequence, there is an interval of at least one element between different windows, at least one of the M windows does not include the first element, and M is an integer greater than or equal to 1;

and obtaining, based on the representation of the first element, an output sequence corresponding to the input sequence.

When M is equal to 1, it indicates that self-attention calculation may be performed on the first element by using an element in one window (denoted as a first window). The first window includes one element or a plurality of consecutive elements other than the first element in the input sequence. In other words, the first window includes one other element or a plurality of other consecutive elements in the input sequence while skipping the first element. Optionally, the first window does not include an adjacent element of the first element either.

A position of the first window may be flexibly configured but is not fixed. The first window may be at any position in the input sequence provided that the first window skips the first element (or the adjacent element of the first element).

A size of the first window, that is, a quantity of elements included in the first window, is also configurable but is not fixed.

In this application, for the first element in the sequence, self-attention calculation may be performed by using the element in the first window instead of all elements in the sequence. This can reduce a self-attention calculation amount.

In the conventional technology, during obtaining of a representation of an element in a sequence, several elements near the element are fixedly selected for self-attention calculation. As a result, a self-attention dependency range is limited. In this application, self-attention calculation is performed on the first element in the sequence based on the element in the first window. The first window may skip the first element and the adjacent element of the first element, and the position of the first window may not be fixed. Therefore, compared with the conventional technology, a limitation on a self-attention dependency range can be reduced.

Therefore, in this embodiment of this application, a self-attention calculation amount and a self-attention dependency range can be well balanced.

With reference to the first aspect, in a possible implementation of the first aspect, the method further includes: determining the M windows based on a position of the first element in the input sequence, where the M windows include the first window, the first window includes an element that is in the input sequence and whose dependency length from the first element is greater than or equal to a and is less than b, a is an integer greater than 1, b is an integer greater than a, and the dependency length indicates a distance between the first element and an element in the M windows.

In actual application, values of a and b may be flexibly configured based on an application requirement, to properly determine the position of the first window and select an appropriate self-attention dependency range.

The self-attention dependency range indicates, for an element, a range of a dependency length between the element and another element that has established a relationship with the element (that is, self-attention calculation is performed). The dependency length indicates a distance between the element and the another element.

Optionally, in this implementation, the method is applied to a plurality of self-attention layers, and the input sequence is a sequence output by a preceding self-attention layer of a current self-attention layer, where values of b and a are set so that there is no repeated calculation between self-attention calculation performed by the current self-attention layer on the first element and self-attention calculation performed by the preceding self-attention layer on the first element.

It is assumed that the preceding self-attention layer performs self-attention calculation on the first element based on an element included in a fifth window, where the fifth window includes an element that is in the sequence and whose dependency length from the first element is greater than or equal to a1 and is less than b1, b1 is a positive integer, a1 is a non-negative integer less than b1, and a value of a is greater than a value of b1.

In this application, a position of a window used for performing self-attention calculation on the first element is determined based on the position of the first element in the sequence, so that a self-attention dependency range can be flexibly selected for the first element. Therefore, a limitation on a self-attention dependency range can be further reduced.

With reference to the first aspect, in a possible implementation of the first aspect, the position of the first window may be preset.

With reference to the first aspect, in a possible implementation of the first aspect, M is greater than 1, and a value of M is preset.

That M is greater than 1 indicates that self-attention calculation may be performed on the first element by using elements in a plurality of windows.

That a value of M is preset indicates that the value of M is irrelevant to a length of the input sequence. In other words, the value of M may not increase with an increase in the length of the input sequence.

In this application, self-attention calculation is performed on an element in the sequence by using more than one window, so that a self-attention dependency range can be ensured. It can be understood that, for an element, a larger quantity of windows used for performing self-attention calculation indicates a larger self-attention dependency range of the element. In this embodiment of this application, a quantity of windows may be properly set to ensure a self-attention dependency range.

In addition, a quantity M of windows used for performing self-attention calculation on an element is irrelevant to the length of the input sequence. Therefore, a problem that calculation overheads increase in a square manner with a length of an input sequence in the conventional technology can be avoided. Therefore, compared with the conventional technology, a self-attention calculation amount can be reduced. In addition, there is an interval of one or more elements between different windows of the M windows. This can also reduce a self-attention calculation amount.

With reference to the first aspect, in a possible implementation of the first aspect, the M windows include a second window and/or a third window.

For the second window, the second window includes an element that is located before the first element in the input sequence and whose dependency length from the first element is greater than or equal to a1 and is less than b1, where b1 is a positive integer, and a1 is a non-negative integer less than b1.

For the third window, the third window includes an element that is located after the first element in the input sequence and whose dependency length from the first element is greater than or equal to ar and is less than br, where br is a positive integer, and ar is a non-negative integer less than br.

When the M windows include the second window and the third window, a1 and ar may be equal or unequal, and b1 and br may be equal or unequal.

With reference to the first aspect, in a possible implementation of the first aspect, the M windows include a fourth window, and the fourth window includes the first element and the adjacent element of the first element.

With reference to the first aspect, in a possible implementation of the first aspect, the input sequence is a speech sequence or a text sequence.

According to a second aspect, an apparatus for sequence processing is provided. The apparatus includes a receiving unit, a processing unit, and an output unit.

The receiving unit is configured to receive an input sequence, where the input sequence includes a plurality of elements in order. The processing unit is configured to perform self-attention calculation on a first element in the input sequence by using an element included in M windows, to obtain a representation of the first element, where each of the M windows includes one element or a plurality of consecutive elements in the input sequence, there is an interval of at least one element between different windows, at least one of the M windows does not include the first element, and M is an integer greater than or equal to 1. The output unit is configured to obtain, based on the representation of the first element, an output sequence corresponding to the input sequence With reference to the second aspect, in a possible implementation of the second aspect, the processing unit is further configured to determine the M windows based on a position of the first element in the input sequence, where the M windows include the first window, the first window includes an element that is in the input sequence and whose dependency length from the first element is greater than or equal to a and is less than b, a is an integer greater than 1, b is an integer greater than a, and the dependency length indicates a distance between the first element and an element in the M windows.

With reference to the second aspect, in a possible implementation of the second aspect, the apparatus is used in a plurality of self-attention layers, and the input sequence is a sequence output by a preceding self-attention layer of a current self-attention layer, where values of b and a are set so that there is no repeated calculation between self-attention calculation performed by the current self-attention layer on the first element and self-attention calculation performed by the preceding self-attention layer on the first element.

With reference to the second aspect, in a possible implementation of the second aspect, the preceding self-attention layer performs self-attention calculation on the first element based on an element included in a fifth window, where the fifth window includes an element that is in the sequence and whose dependency length from the first element is greater than or equal to a1 and is less than b1, b1 is a positive integer, a1 is a non-negative integer less than b1, and a value of a is greater than a value of b1.

With reference to the second aspect, in a possible implementation of the second aspect, M is greater than 1, and a value of M is preset.

With reference to the second aspect, in a possible implementation of the second aspect, the M windows include a second window and/or a third window. For descriptions of the second window and the third window, refer to the foregoing descriptions. Details are not described herein again.

With reference to the second aspect, in a possible implementation of the second aspect, the M windows include a fourth window, and the fourth window includes the first element and the adjacent element of the first element.

With reference to the second aspect, in a possible implementation of the second aspect, the input sequence is a speech sequence or a text sequence.

According to a third aspect, a neural network processing apparatus is provided, including an input module, a processing module, an output module, and the apparatus for sequence processing according to any one of claims 9 to 16. The input module is configured to input an input sequence to the apparatus for sequence processing. The apparatus for sequence processing is configured to perform self-attention calculation on the input sequence to obtain an output sequence corresponding to the input sequence. The processing module is configured to process the output sequence to obtain a sequence processing result. The output module is configured to output an output signal based on the sequence processing result obtained by the processing module. When the input sequence is a speech sequence, the processing module is configured to perform speech recognition processing on the output sequence to obtain a speech recognition result. Alternatively, when the input sequence is a text sequence, the processing module is configured to perform semantic understanding processing on the output sequence to obtain a semantic understanding result.

According to a fourth aspect, a data processing apparatus is provided. The apparatus includes: a memory, configured to store a program; and a processor, configured to execute the program stored in the memory. When the program stored in the memory is executed, the processor is configured to perform the method in the first aspect.

According to a fifth aspect, a computer-readable medium is provided. The computer-readable medium stores program code to be executed by a device. The program code is used for performing the method in the first aspect.

According to a sixth aspect, a computer program product including instructions is provided. When the computer program product runs on a computer, the computer is enabled to perform the method in the first aspect.

According to a seventh aspect, a chip is provided. The chip includes a processor and a data interface. The processor reads, by using the data interface, instructions stored in a memory, to perform the method in the first aspect.

Optionally, in an implementation, the chip may further include a memory. The memory stores instructions. The processor is configured to execute the instructions stored in the memory. When the instructions are executed, the processor is configured to perform the method in the first aspect.

Based on the foregoing descriptions, in the solutions provided in this application, self-attention calculation may be performed on the first element in the sequence based on the element in the first window. The first window may skip the first element and the adjacent element of the first element, and the position of the first window may not be fixed. Therefore, compared with the conventional technology, a limitation on a self-attention dependency range can be reduced.

In addition, in this application, during obtaining of a representation of an element in a sequence, self-attention calculation may be performed by using elements in a plurality of windows. A quantity of the plurality of windows is irrelevant to a length of the sequence, and there is an interval between different windows. This can take a self-attention dependency range into account as far as possible while reducing a self-attention calculation amount, thereby achieving a balance between a self-attention calculation amount and a self-attention dependency range.

BRIEF DESCRIPTION OF DRAWINGS

FIG. 3 is a schematic diagram of a local self-attention mechanism;

FIG. 4 is a schematic flowchart of a method for sequence processing according to an embodiment of this application;

DESCRIPTION OF EMBODIMENTS

Many issues about speech processing and natural language processing (NLP) may be considered as sequence data processing issues, which may be briefly referred to as sequence processing issues.

Figure 1:
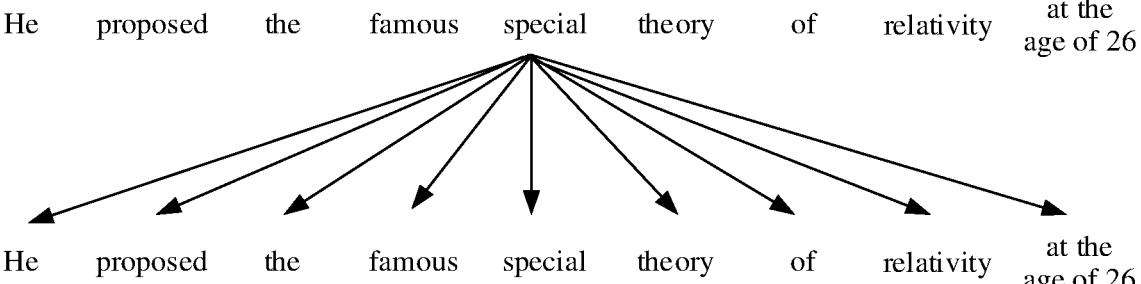
FIG. 1 is a schematic diagram of a self-attention mechanism.

For example, in a natural speech processing system, an input sentence may be represented as a word sequence. As shown in FIG. 1, the following sentence is represented as a word sequence: "he proposed the famous special theory of relativity at the age of 26". The word sequence may also be referred to as a text sequence. For another example, in a speech recognition system, a segment of continuous speech is split into frames with equal time, that is, may be represented as a frame sequence. The frame sequence may also be referred to as a speech sequence.

A sequence includes several elements, and the elements are in order. For example, speech data may be represented as a sequence in which a sampling point is an element. For another example, text data may be represented as a sequence in which a word is an element. For example, in the example of FIG. 1, "he", "proposed", "the", "famous", "special", "theory", "of", "relativity", "at", "the", "age", "of", and "26" are elements in the text sequence: "he proposed the famous special theory of relativity at the age of 26".

A meaning of an element in a sequence is usually related to another element in the sequence. For example, in the example of FIG. 1, the element "he" and the element "proposed" are in a subject-predicate relationship in grammar. How to model a relationship between elements in a sequence is the key to a sequence processing issue.

In a current technology, methods for modeling a relationship between elements in a sequence include a recurrent neural network (RNN), a convolutional neural network (CNN), and self-attention. Self-attention is a method for obtaining a representation of an element in a sequence by establishing a relationship between the element and another element in the sequence. In other words, self-attention is a method used for modeling a relationship between elements in a sequence to obtain a better representation of an element. For an element, with respect to a representation of the element before self-attention calculation is performed, a representation obtained after self-attention calculation may be referred to as a new representation of the element.

Figure 2:
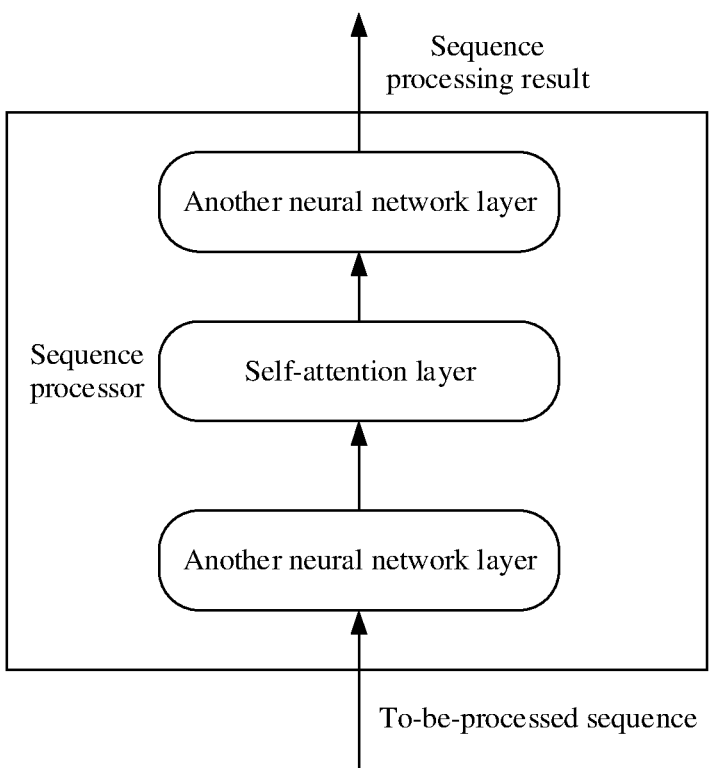
FIG. 2 is a schematic diagram of an architecture of a neural network including a self-attention layer.

Self-attention may serve as a layer in a neural network. A neural network including a self-attention layer may also be referred to as an input sequence processor. FIG. 2 is a schematic block diagram of an input sequence processor. The input sequence processor is a neural network including a self-attention layer, and the neural network may further include another neural network layer.

For example, a to-be-processed sequence is input to a sequence processor; the self-attention layer performs a self-attention operation on the sequence to obtain a new representation of each element in the sequence, so as to obtain a new sequence; and the new sequence is input to the another neural network layer for processing, to finally obtain a sequence processing result, that is, the sequence processor outputs the sequence processing result. For example, the to-be-processed sequence is a text sequence, and the sequence processing result output by the sequence processor may be a text processing result, for example, a semantic understanding result or a machine translation result. For another example, the to-be-processed sequence is a speech sequence, and the sequence processing result output by the sequence processor may be a speech processing result, for example, a speech recognition result.

It should be noted that FIG. 2 is merely an example but not a limitation. For example, the to-be-processed sequence may be processed by a feature extraction module and then input to the sequence processor. For another example, the sequence processor may include one or more self-attention layers, and in a scenario with a plurality of self-attention layers, another neural network layer may be included between two self-attention layers. An architecture design of a neural network including a self-attention layer belongs to the conventional technology, and details are not described in this specification.

In a conventional self-attention method, for an element, a relationship between the element and all elements in a sequence is established, that is, for the element, all the elements in the sequence are used for self-attention calculation.

As shown in FIG. 1, for the text sequence "he proposed the famous special theory of relativity at the age of 26", all elements in the sequence are selected for self-attention calculation during calculation of a representation of the element "special" in the sequence. For example, scores of the element "special" and all other elements in the sequence are calculated. The score indicates whether "special" has a specific relationship with the other elements. A higher score indicates a higher possibility that the relationship exists.

Conventional self-attention is described mathematically as follows.

It is assumed that a sequence is represented as $H=\{h_1, h_2, \ldots h_i, \ldots, h_L\}$, where $h_i$ indicates an element in the sequence H. For example, each element $h_i$ is represented by a vector with a width of d. A process of modeling a relationship between the element $h_i$ and other elements in the sequence through self-attention and obtaining a new representation $$h_i'$$

of the element $h_i$ may be expressed as follows:

$$h_i' = \text{Attend}(h_i, S),$$

where
S=H, and Attend( ) indicates a self-attention calculation method.

There are a plurality of self-attention calculation methods. For example, a self-attention calculation method is shown below:

$$\text{Attend }(h_i, S) = \text{softmax}\left(\frac{Q(h_i)K(S^T)}{\sqrt{d}}\right)V(S),$$

Q( ), K( ), and V( ) each are usually a linear mapping, d indicates a width of a vector used for representing an element, that is, each element in the sequence is represented by a vector with a width of d, and Softmax( ) indicates a normalized exponential function. A self-attention calculation method belongs to the conventional technology, and details are not described in this specification.

It should be understood that self-attention calculation is performed on a sequence in the manner shown in the foregoing formula, where a self-attention calculation amount of a single element is O(Ld), and a calculation amount of the entire sequence is $O(L^2d)$. It can be learned that, when self-attention calculation is performed on a sequence in the manner shown in the foregoing formula, calculation overheads increase in a square manner with a length of the input sequence. Therefore, during processing of a long sequence, a calculation amount is usually excessively large.

To reduce a self-attention calculation amount, a local self-attention (also referred to as truncated self-attention) solution is proposed in a current technology. In the local self-attention solution, during calculation of a representation of an element in a sequence, only several elements near the element, instead of all elements in the sequence, are selected for self-attention calculation. As shown in FIG. 3, a text sequence is "he proposed the famous special theory of relativity at the age of 26". During calculation of a representation of the element "special", only the elements "the", "famous", "special", "theory", and "of" near the element "special" are selected for self-attention calculation.

However, the local self-attention solution leads to a problem that a self-attention dependency range is limited.

The self-attention dependency range indicates, for an element, a range of a dependency length between the element and another element that has established a relationship with the element (that is, self-attention calculation is performed). The dependency length indicates a distance between the element and the other element. For example, in the example of FIG. 3, for the element "proposed", assuming that a dependency length between the element "proposed" and "proposed" itself is denoted as 0, a dependency length between the element "proposed" and the element "he" is 1 (likewise, a dependency length between the element "proposed" and the element "the" is also 1), and a dependency length between the element "proposed" and the element "famous" is 2. That is, in the example of FIG. 3, a dependency range for self-attention calculation of the element "proposed" is 0-2.

It can be learned from the foregoing descriptions that a self-attention dependency range and a self-attention calculation amount cannot be balanced in the conventional technology.

To resolve the foregoing problem, this application provides a method and an apparatus for sequence processing, to well balance a self-attention calculation amount and a self-attention dependency range.

FIG. 4 is a schematic flowchart of a method 400 for sequence processing according to an embodiment of this application. The method 400 includes step S410, step S430, and step S430.

S410: Receive an input sequence, where the input sequence includes a plurality of elements in order.

The input sequence represents a sequence on which self-attention processing is to be performed.

In an example, the method 400 is performed by the self-attention layer shown in FIG. 2, and the input sequence may be a sequence output by a neural network layer preceding the self-attention layer.

For example, the input sequence may be a speech sequence. For example, in a speech recognition system, a segment of continuous speech is split into frames with equal time, and a formed frame sequence may be referred to as a speech sequence. For example, the speech sequence is a sequence whose element is a sampling point.

For another example, the input sequence may be a text sequence. For example, in a natural speech processing system, an input sentence may be represented as a word sequence. As shown in FIG. 1, the following sentence is represented as a word sequence: "he proposed the famous special theory of relativity at the age of 26". The word sequence may also be referred to as a text sequence. The text sequence is a sequence whose element is a word.

S420: Perform self-attention calculation on a first element in the input sequence by using an element included in M windows, to obtain a representation of the first element, where each of the M windows includes one element or a plurality of consecutive elements in the input sequence, there is an interval of at least one element between different windows, at least one of the M windows does not include the first element, and M is an integer greater than or equal to 1.

The first element represents any element in the input sequence. As described above, self-attention processing on a sequence includes self-attention calculation on each element in the sequence. In this embodiment of this application, naturally, self-attention calculation needs to be performed on each element in the input sequence, to obtain a representation of a corresponding element. Considering that self-attention calculation methods for all elements in a sequence are similar, and for ease of understanding and description, in this embodiment of this application, the first element is used as an example for description. In other words, for any element in the input sequence, self-attention calculation is performed on the element in the manner of step S420 to obtain a representation of the element.

When M is equal to 1, it indicates that self-attention calculation may be performed on the first element by using an element in one window (denoted as a first window). The first window includes one element or a plurality of consecutive elements other than the first element in the input sequence. In other words, the first window includes one other element or a plurality of other consecutive elements in the input sequence while skipping the first element.

Optionally, the first window does not include an adjacent element of the first element.

The adjacent element of the first element includes an element adjacent to the first element.

Figure 5:
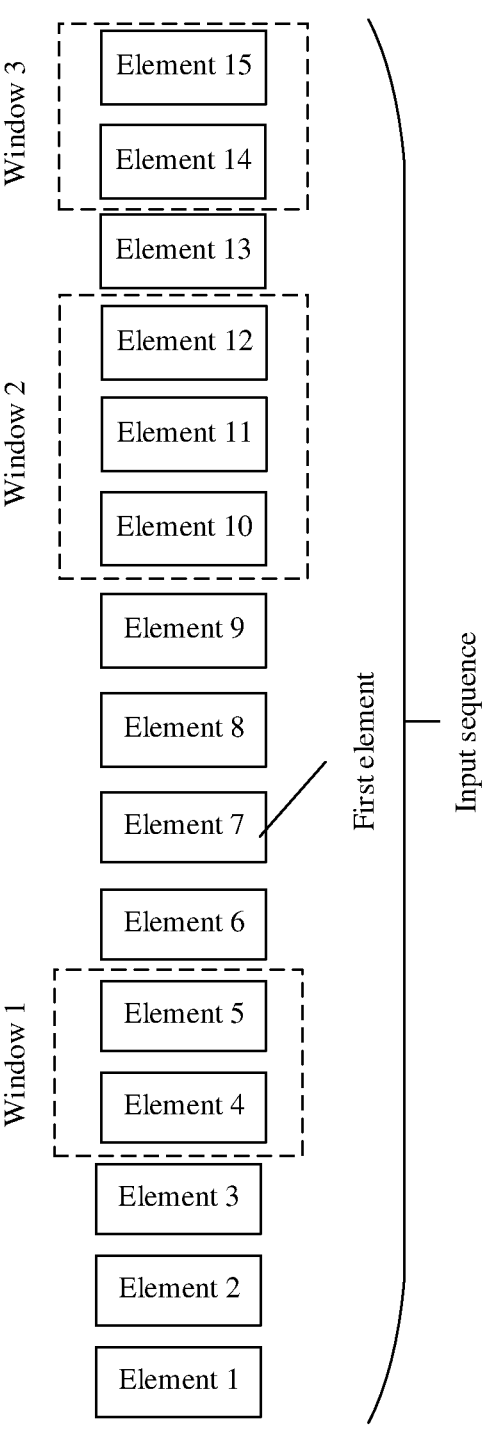
FIG. 5 is a schematic diagram of a window used for performing self-attention calculation on a first element in a sequence according to an embodiment of this application.

For example, in an example of FIG. 5, the first element is an element 7, and the adjacent element of the first element includes an adjacent element 6 preceding the element 7 and an adjacent element 8 on the right of the element 7.

When M is greater than 1, it indicates that self-attention calculation may be performed on the first element by using elements in a plurality of windows. The following describes a case in which M is greater than 1.

The following first provides descriptions by using an example in which self-attention calculation is performed on the first element by using the element in the first window in step S420.

A position of the first window may be flexibly configured but is not fixed. The first window may be at any position in the input sequence provided that the first window skips the first element (or the adjacent element of the first element).

For example, the first window is located before the first element. For another example, the first window is located after the first element.

When the first element is the $1^{st}$ element in the input sequence, the first window is located after the first element; when the first element is the last element in the input sequence, the first window is located before the first element; or when the first element is an intermediate element in the input sequence, the first window may be located before or after the first element.

In actual application, the position of the first window may be properly determined based on an application requirement.

A size of the first window, that is, a quantity of elements included in the first window, is also configurable but is not fixed.

For example, the first window includes one, two, three, or more elements.

In application, the size of the first window may be properly configured based on an application requirement.

In an example, as shown in FIG. 5, the input sequence includes an element 1 to an element 15, the first element is the element 7, and the first window may be any window of a window 1, a window 2, and a window 3 shown in FIG. 5.

For example, self-attention calculation may be performed on the first element $h_i$ by using the following formula, to obtain a new representation $$h_i'$$

of the first element:

$$h_i' = \text{Attend}(h_i, S),$$

where

S indicates a set of elements used for performing self-attention calculation on the first element, S includes the element in the first window, and Attend( ) indicates a self-attention calculation method. A self-attention calculation method belongs to the conventional technology, and details are not described in this specification.

S430: Obtain, based on the representation of the first element, an output sequence corresponding to the input sequence.

It should be understood that, in step S430, the output sequence is obtained based on a representation of each element in the input sequence. For each element in the input sequence, a representation of a corresponding element is obtained in the manner of step S420.

In an example, the method 400 is performed by the self-attention layer shown in FIG. 2, and the output sequence obtained in step S430 may be passed to a next neural network layer of the self-attention layer for subsequent processing.

In this embodiment of this application, for the first element in the sequence, self-attention calculation is performed based on the element in the first window instead of all elements in the sequence. This can reduce a self-attention calculation amount.

In addition, as described above, in the conventional technology shown in FIG. 3, during obtaining of a representation of an element in a sequence, several elements near the element are fixedly selected for self-attention calculation. As a result, a self-attention dependency range is limited.

In this embodiment of this application, self-attention calculation is performed on the first element in the sequence based on the element in the first window. The first window may skip the first element and the adjacent element of the first element, and the position of the first window may not be fixed. Therefore, compared with the conventional technology, a limitation on a self-attention dependency range can be reduced.

Therefore, in this embodiment of this application, a self-attention calculation amount and a self-attention dependency range can be well balanced.

In the self-attention mechanism provided in this embodiment of this application, a window used for performing self-attention calculation is not fixed, but may dynamically change. Therefore, the self-attention mechanism provided in this embodiment of this application may be referred to as jumping self-attention.

A position of the first window in the input sequence may be determined in a plurality of manners.

In a first manner, the position of the first window is determined based on a position of the first element.

For example, the first window is set to include an element that is in the input sequence and whose dependency length from the first element is greater than or equal to a and is less than b, where the dependency length indicates a distance between the first element and the element in the first window, a is an integer greater than 1, and b is an integer greater than a. It should be understood that a value of b is less than a length of the input sequence.

Figure 6:
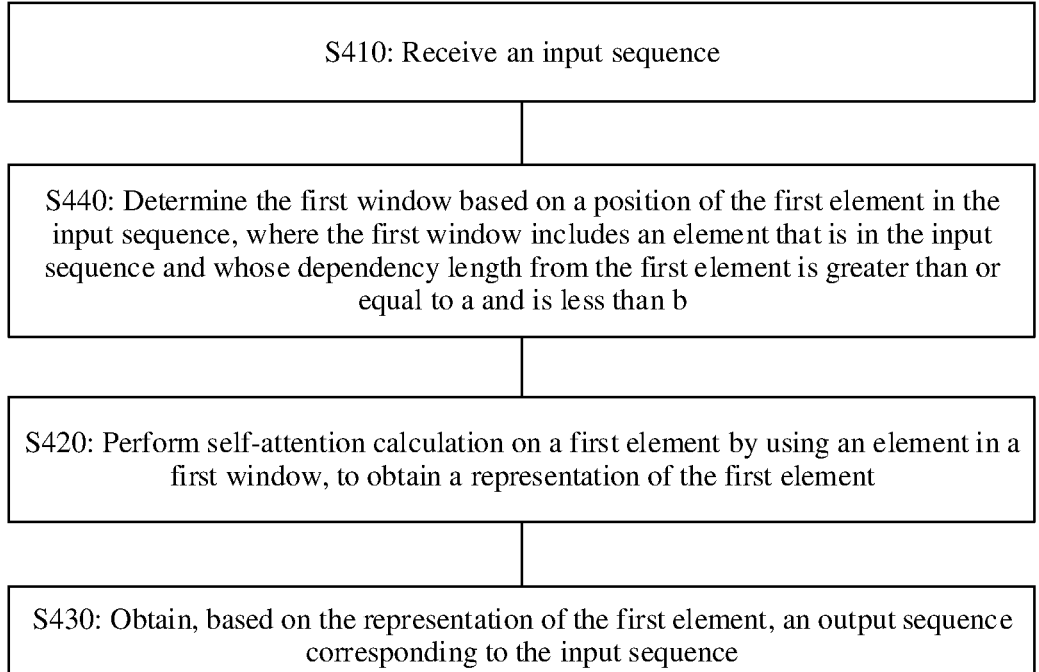
FIG. 6 is another schematic flowchart of a method for sequence processing according to an embodiment of this application.

Optionally, as shown in FIG. 6, in the embodiment shown in FIG. 4, the method 400 may further include step S440.

S440: Determine the first window based on the position of the first element in the input sequence, where the first window includes an element that is in the input sequence and whose dependency length from the first element is greater than or equal to a and is less than b, a is an integer greater than 1, and b is an integer greater than a. In step S420, self-attention calculation is performed on the first element by using the element in the first window, to obtain the representation of the first element.

For example, a new representation of the first element is obtained only by using the element in the first window, and self-attention calculation may be performed on the first element $h_i$ by using the following formula, to obtain the new representation $$h_i'$$

of the first element:

$$h_i' = \text{Attend}(h_i, S),$$

where $S=\{h_j | i-b \leq j \leq i-a\}$, and Attend( ) indicates a self-attention calculation method.

It should be understood that values of a and b may be set to flexibly select a dependency range of the first element.

Still as shown in FIG. 5, if the first window is set to include an element that is in the input sequence and whose dependency length from the first element (namely, the element 7 in FIG. 5) is greater than 1 and less than 4, the first window may be the window 1; if the first window is set to include an element that is in the input sequence and whose dependency length from the first element is greater than 1 and less than 5, the first window is still the window 1; if the first window is set to include an element that is in the input sequence and whose dependency length from the first element is greater than 2 and less than 6 (or 7 or 8), the first window is the window 2; or if the first window is set to include an element that is in the input sequence and whose dependency length from the first element is greater than 6 and less than 9, the first window is the window 3.

The foregoing descriptions with reference to FIG. 5 are merely an example but not a limitation. In actual application, values of a and b may be flexibly configured based on an application requirement, to properly determine the position of the first window and select an appropriate self-attention dependency range.

In this embodiment of this application, a position of a window used for performing self-attention calculation on the first element is determined based on the position of the first element in the sequence, so that a self-attention dependency range can be flexibly selected for the first element. Therefore, a limitation on a self-attention dependency range can be further reduced.

In a second manner, the position of the first window is preset. For example, the position of the first window is irrelevant to the position of the first element. For example, still as shown in FIG. 5, the window 2 may be set to be used for performing self-attention calculation on both the element 7 and the element 8.

Still as shown in FIG. 2, a neural network including a self-attention layer usually includes a plurality of self-attention layers. For example, "×N" shown in FIG. 2 indicates that the neural network may include a combination of N layers indicated by dashed lines in FIG. 2, that is, the neural network includes a plurality of self-attention layers.

The method for sequence processing according to this embodiment of this application may be applied not only to a single self-attention layer, but also to a plurality of self-attention layers. Positions of windows on two adjacent layers may be properly set to further reduce a self-attention calculation amount. Descriptions are provided below.

Optionally, in the embodiment shown in FIG. 4, the method 400 is applied to a plurality of self-attention layers, and the input sequence is a sequence output by a preceding self-attention layer of a current self-attention layer. The position of the first window is determined based on the position of the first element, and the first window includes an element that is in the input sequence and whose dependency length from the first element is greater than or equal to a and is less than b, where values of b and a are set so that there is no repeated calculation between self-attention calculation performed by the current self-attention layer on the first element and self-attention calculation performed by the preceding self-attention layer on the first element.

For ease of understanding and description, the current self-attention layer is denoted as a self-attention layer X, and the preceding self-attention layer of the self-attention layer X is denoted as a self-attention layer (X−1). It is assumed that the self-attention layer (X−1) has established a relationship between the first element and an element 1 when performing self-attention calculation on the first element. In this case, in the method 400, values of b and a may be set to skip the element 1, and another element is used for performing self-attention calculation on the first element.

For example, the self-attention layer (X−1) performs self-attention calculation on the first element based on an element included in the fifth window, where the fifth window includes an element that is in the sequence and whose dependency length from the first element is greater than or equal to a1 and is less than b1, b1 is a positive integer, and a1 is a non-negative integer less than b1. In this case, in the method 400, a value of a is greater than a value of b1.

Figure 7:
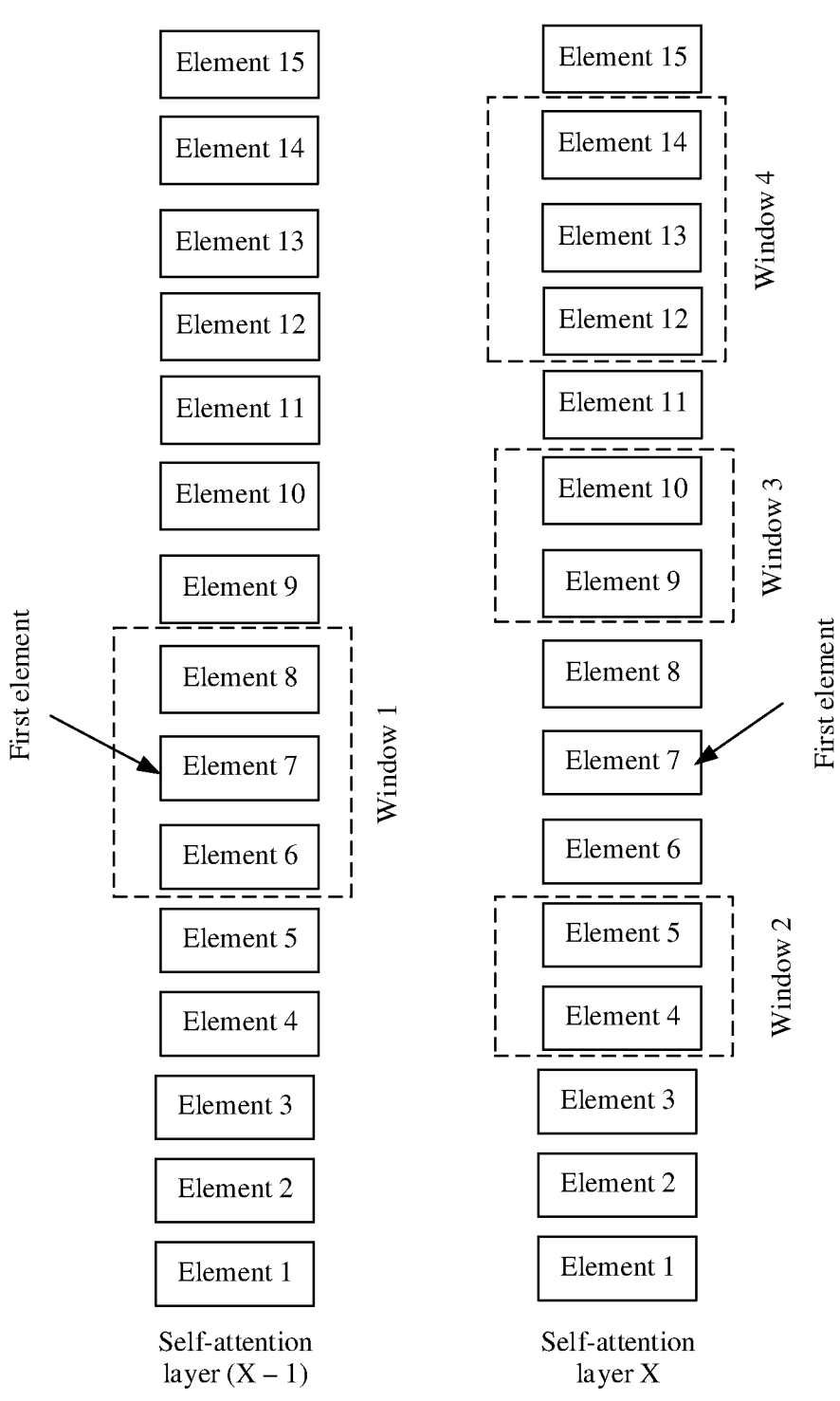
FIG. 7 is a schematic diagram of a window used for performing self-attention calculation on a first element in a sequence when an embodiment of this application is applied to a scenario with a plurality of self-attention layers.

In an example, as shown in FIG. 7, the input sequence includes an element 1 to an element 15, and the first element is the element 7. The self-attention layer (X−1) is a preceding self-attention layer of the self-attention layer X, and an input sequence of the self-attention layer X is obtained based on an output sequence of the self-attention layer (X−1). The self-attention layer (X−1) performs self-attention calculation on the first element by using an element in a window 1. In this case, the self-attention layer X may skip the elements 6, 7, and 8 when performing self-attention calculation on the first element, for example, may perform calculation by using an element in a window 2, a window 3, or a window 4, to avoid repeated calculation.

It should be noted that FIG. 7 is merely an example but not a limitation. In actual application, windows on two vertically adjacent self-attention layers may be arranged in a coordinated manner based on a specific requirement, to reduce a self-attention calculation amount.

In the example of FIG. 7, when there is no other neural network layer between the self-attention layer (X−1) and the self-attention layer X, the input sequence of the self-attention layer X is directly the output sequence of the self-attention layer (X−1). For example, when there is another neural network layer between the self-attention layer (X−1) and the self-attention layer X, the input sequence of the self-attention layer X is a sequence that is obtained by the another neural network layer by processing the output sequence of the self-attention layer (X−1) and that is then output by the another neural network layer.

In another example, in a scenario with three self-attention layers, it is assumed that, for the first element in the sequence, self-attention calculation is performed at each self-attention layer by using an element in a window including an element that is in the sequence and whose dependency length from the first element is greater than a and less than b. It is assumed that a self-attention layer 1 is a preceding self-attention layer of a self-attention layer 2, and the self-attention layer 2 is a preceding self-attention layer of a self-attention layer 3. Definitions of a and b at the three self-attention layers are shown in Table 1.

TABLE 1

| Self-attention layer | a | b |
|---|---|---|
| 1 | 0 | 5 |
| 2 | 5 | 12 |
| 3 | 12 | 18 |

In this embodiment of this application, the position of the first window used for performing self-attention calculation on the first element is determined based on the position of the first element in the sequence, so that repeated calculation between a plurality of attention layers can be avoided, thereby further reducing a self-attention calculation amount.

As described above, in this embodiment of this application, self-attention calculation may be performed on the first element by using an element in one or more windows.

Optionally, in the embodiment shown in FIG. 4, step S420 includes: performing self-attention calculation on the first element by using an element in one window (namely, the first window), to obtain the representation of the first element.

Optionally, in the embodiment shown in FIG. 4, step S420 includes: performing self-attention calculation on the first element by using an element included in M windows, to obtain the representation of the first element, where each of the M windows includes one element or a plurality of consecutive elements in the input sequence, there is an interval of at least one element between different windows, the M windows include the first window, M is greater than 1, and a value of M is preset.

In an example, the M windows used for performing self-attention calculation on the first element are shown in FIG. 8, FIG. 9, FIG. 10, FIG. 11, and FIG. 12. For example, in FIG. 8, the input sequence includes an element 1 to an element 15, the M windows used for performing self-attention calculation on the first element include a window 1 that includes elements 1, 2, and 3, and a window 2 that includes elements 11, 12, and 13, and there is an interval of seven elements between the window 1 and the window 2.

In this embodiment of this application, self-attention calculation is performed on an element in the sequence by using more than one window, so that a self-attention dependency range can be ensured. It can be understood that, for an element, a larger quantity of windows used for performing self-attention calculation indicates a larger self-attention dependency range of the element. In this embodiment of this application, a quantity of windows may be properly set to ensure a self-attention dependency range.

That a value of M is preset indicates that the value of M is irrelevant to the length of the input sequence. In other words, the value of M may not increase with an increase in the length of the input sequence.

In an example, assuming that the length of the input sequence is L1, the value of M is set to Q; or assuming that the length of the input sequence is L2 (L2>L1), the value of M is still set to Q; or assuming that the length of the input sequence is L3 (L3<L1), the value of M is still set to Q. For example, Q is equal to 2, 3, or another integer greater than 1.

In this embodiment of this application, a quantity M of windows used for performing self-attention calculation on an element is irrelevant to the length of the input sequence. Therefore, a problem that calculation overheads increase in a square manner with a length of an input sequence in the conventional technology can be avoided. Therefore, compared with the conventional technology, a self-attention calculation amount can be reduced.

In addition, in this embodiment of this application, there is an interval of one or more elements between different windows of M windows used for performing self-attention calculation on an element. This can also reduce a self-attention calculation amount.

In addition, the value of M is preset. That is, in this embodiment of this application, a self-attention calculation amount can be controlled to some extent, and therefore the value of M may be set to reduce a self-attention calculation amount.

The value of M may be determined based on an application requirement. For example, the value of M may be properly set based on a current calculation capability. When the calculation capability is strong, a large value may be set for M; or when the calculation capability is weak, a small value may be set for M.

It should be further understood that a larger value of M indicates a larger self-attention dependency range to some extent. Therefore, in this embodiment of this application, a self-attention dependency range can be maximized on the premise that a self-attention calculation amount does not go beyond the calculation capability.

Therefore, in this embodiment of this application, during self-attention calculation on an element in a sequence, calculation is performed by using elements in a plurality of windows. A quantity of the plurality of windows is irrelevant to a length of the sequence, and there is an interval between different windows. This can take a self-attention dependency range into account as far as possible while reducing a self-attention calculation amount, thereby achieving a balance between a self-attention calculation amount and a self-attention dependency range.

The performing self-attention calculation on the first element by using an element included in M windows, to obtain the representation of the first element means establishing a relationship between the first element and each element in the M windows (that is, modeling an element relationship of the first element) to obtain the representation of the first element.

In an example, self-attention calculation may be performed on the first element $h_i$ by using the following formula, to obtain a new representation $$h_i'$$

of the first element:

$$h_i' = \text{Attend}(h_i, S),$$

where
S indicates the element included in the M windows, and Attend( ) indicates a self-attention calculation method. A self-attention calculation method belongs to the conventional technology, and details are not described in this specification.

Similar to the manners of determining the position of the first window, positions of the M windows may also be determined in a plurality of manners. For example, the positions of the M windows are determined based on the position of the first element, or the positions of the M windows are preset and are irrelevant to the position of the first element.

Figure 8:
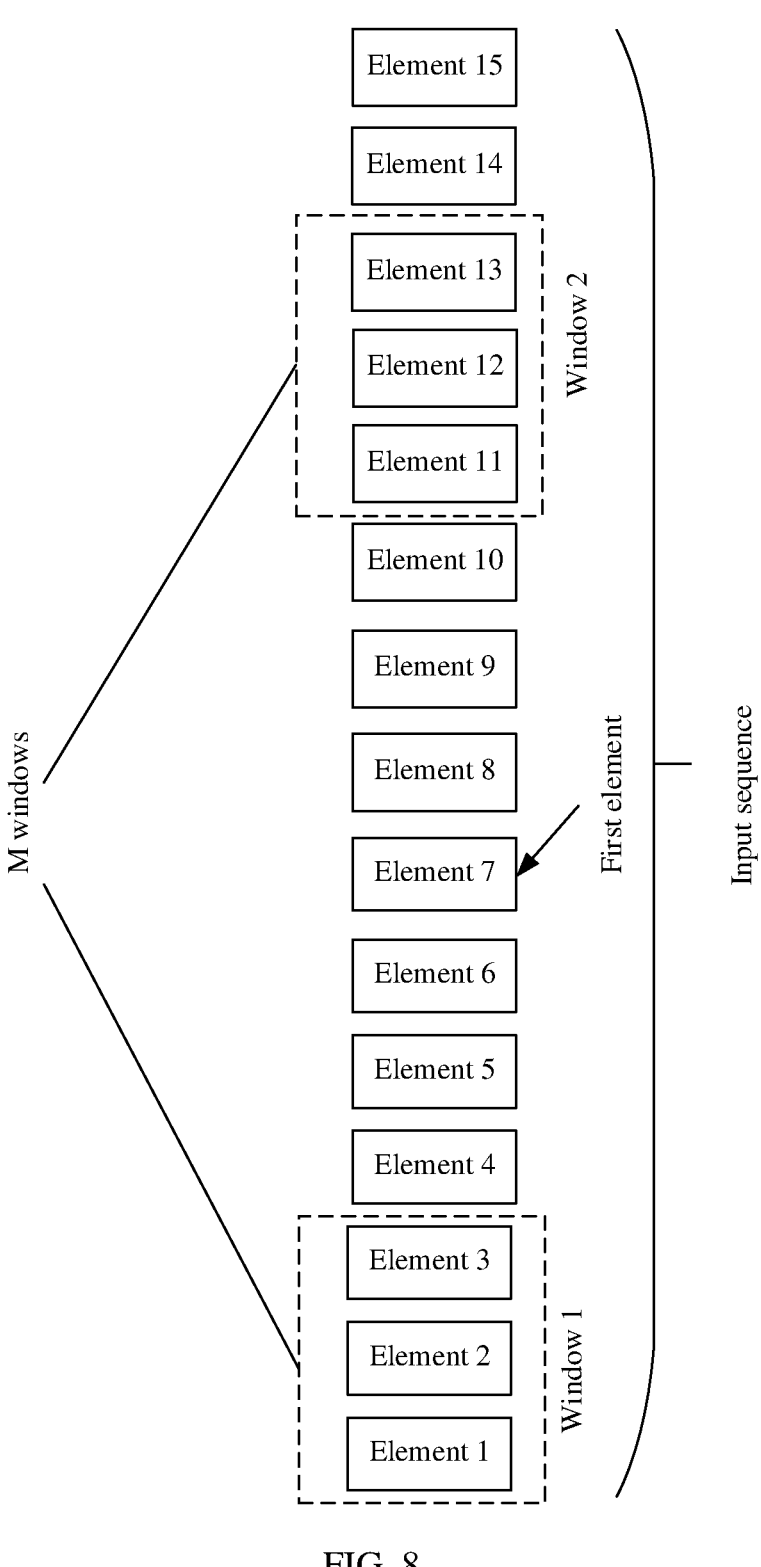
FIG. 8 to FIG. 12 are schematic diagrams of M windows used for performing self-attention calculation on a first element in a sequence according to an embodiment of this application.

In an example, as shown in FIG. 8, the input sequence includes an element 1 to an element 15, and the first element is the element 7. It is assumed that a dependency length between the element 7 and an element in a window used for performing self-attention calculation on the element 7 is set to be greater than 3 and less than 7. In this case, M windows used for performing self-attention calculation on the element 7 include a window 1 and a window 2.

Figure 10:
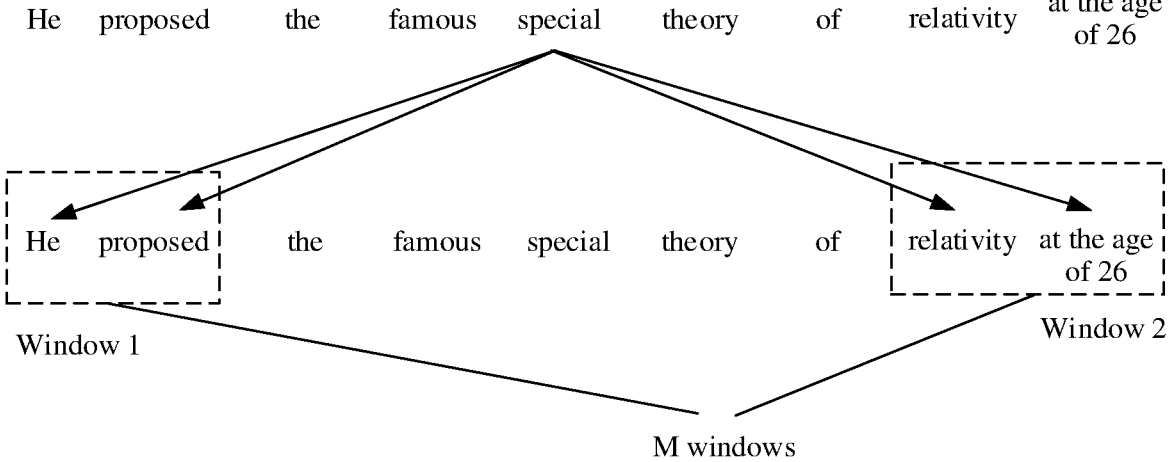

In another example, as shown in FIG. 10, the input sequence is a text sequence: "he proposed the famous special theory of relativity at the age of 26", and the first element is the element "special". It is assumed that a dependency length between the element "special" and an element in a window used for performing self-attention calculation on the element "special" is set to be greater than 2 and less than 5. In this case, M windows used for performing self-attention calculation on the element "special" include a window 1 and a window 2.

In an embodiment in which the positions of the M windows are determined based on the position of the first element, based on different positions of the first element in the input sequence, corresponding manners of determining the M windows may be different.

Manner (1): When the first element is an element at a middle position in the input sequence, the M windows used for performing self-attention calculation on the first element are all located after the first element.

Optionally, in an embodiment in which the positions of the M windows are determined based on the position of the first element, when the first element is an intermediate element in the input sequence, the M windows include a third window. The third window includes an element that is located after the first element in the input sequence and whose dependency length from the first element is greater than or equal to ar and is less than br, where br is a positive integer, and ar is a non-negative integer less than br.

In an example, self-attention calculation may be performed on the first element $h_i$ by using the following formula, to obtain a new representation $$h_i'$$

of the first element:

$$h_i' = \text{Attend}(h_i, S),$$

where
$S=\{h_i | i+ar \leq j \leq i+br\}$, and Attend( ) indicates a self-attention calculation method.

Figure 11:
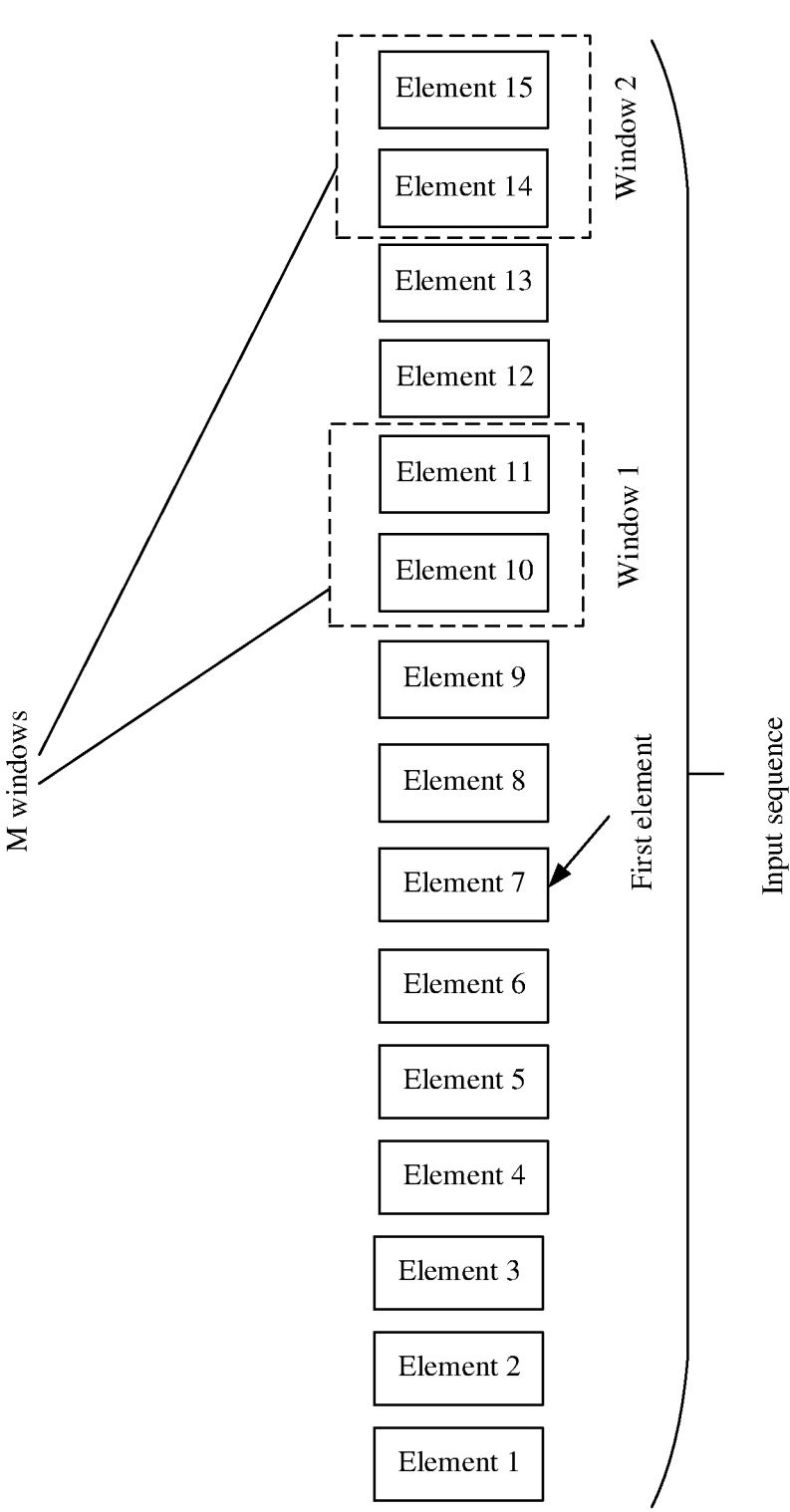

In an example, as shown in FIG. 11, the input sequence includes an element 1 to an element 15, the first element is an intermediate element in the input sequence: the element 7, and the M windows used for performing self-attention calculation on the element 7 include a window 1 and a window 2 that are located after the element 7. A dependency length between the element 7 and an element included in the window 1 is greater than 2 and less than 5, and a dependency length between the element 7 and an element included in the window 2 is greater than 6 and less than 9.

Manner (2): When the first element is an element at a middle position in the input sequence, the M windows used for performing self-attention calculation on the first element are all located before the first element.

Optionally, in an embodiment in which the positions of the M windows are determined based on the position of the first element, when the first element is an intermediate element in the input sequence, the M windows include a second window. The second window includes an element that is located before the first element in the input sequence and whose dependency length from the first element is greater than or equal to a1 and is less than b1, where b1 is a positive integer, and a1 is a non-negative integer less than b1.

In an example, self-attention calculation may be performed on the first element $h_i$ by using the following formula, to obtain a new representation $$h_i'$$

of the first element:

$$h_i' = \text{Attend}(h_i, S),$$

where
S={$h_i$|i−b1≤j≤i−a1}, and Attend( ) indicates a self-attention calculation method.

Figure 12:
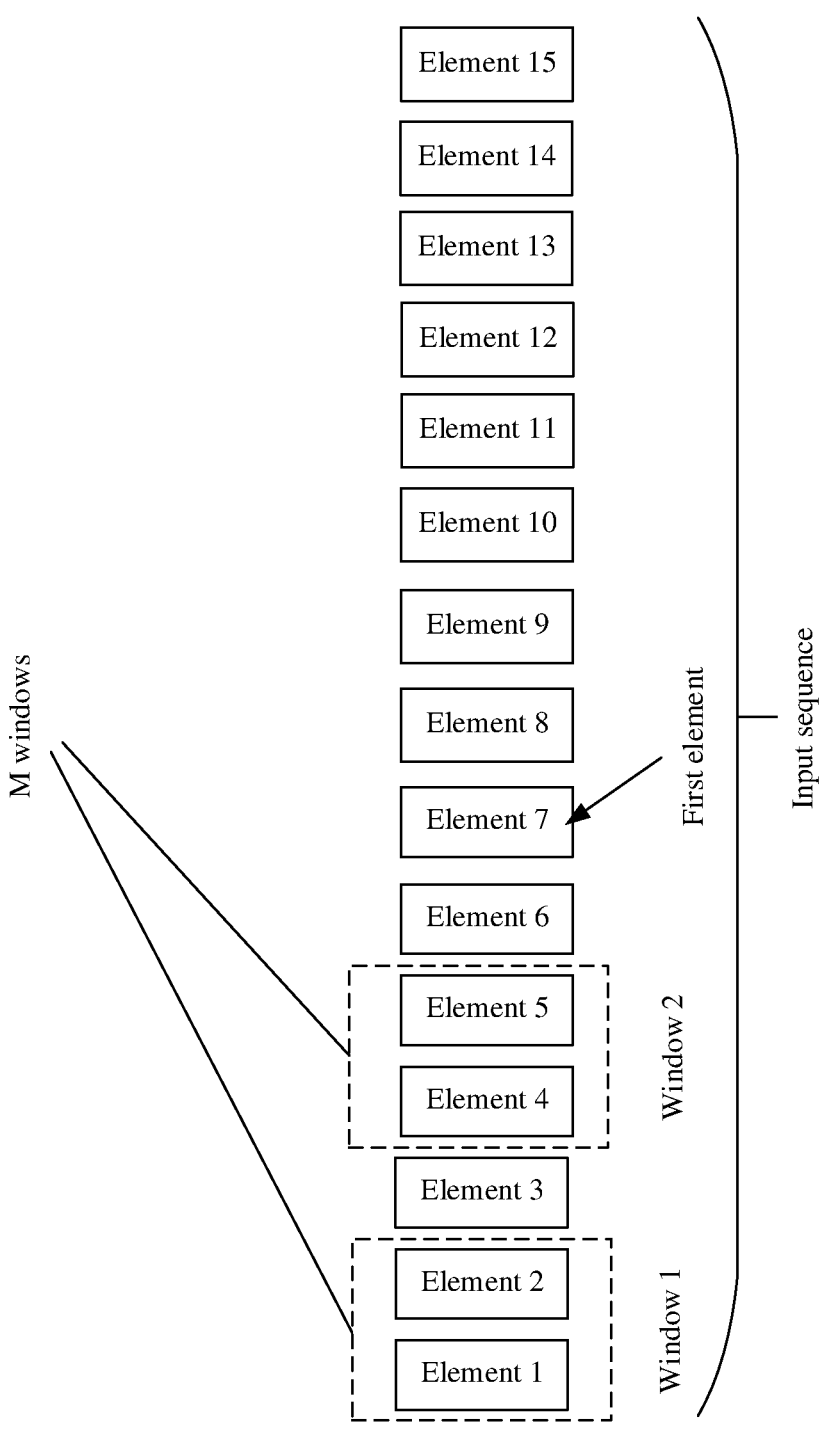

In an example, as shown in FIG. 12, the input sequence includes an element 1 to an element 15, the first element is an intermediate element in the input sequence: the element 7, and the M windows used for performing self-attention calculation on the element 7 include a window 1 and a window 2 that are located before the element 7. A dependency length between the element 7 and an element included in the window 1 is greater than 4 and less than 7, and a dependency length between the element 7 and an element included in the window 2 is greater than 1 and less than 4.

Manner (3): When the first element is an element at a middle position in the input sequence, the M windows used for performing self-attention calculation on the first element may include a window located before the first element and a window located after the first element.

Optionally, in an embodiment in which the positions of the M windows are determined based on the position of the first element, when the first element is an intermediate element in the input sequence, the M windows include a second window and a third window. The second window includes an element that is located before the first element in the input sequence and whose dependency length from the first element is greater than or equal to a1 and is less than b1, where b1 is a positive integer, and a1 is a non-negative integer less than b1. The third window includes an element that is located after the first element in the input sequence and whose dependency length from the first element is greater than or equal to ar and is less than br, where br is a positive integer, and ar is a non-negative integer less than br.

In an example, self-attention calculation may be performed on the first element $h_i$ by using the following formula, to obtain a new representation $$h_i'$$

of the first element:

$$h_i' = \text{Attend}(h_i, S),$$

where
S={$h_i$|i−b1≤j≤i−a1 or i+ar≤j≤i+br}, and Attend( ) indicates a self-attention calculation method.

In this example, a1 and ar may be equal or unequal, and b1 and br may be equal or unequal. In an example, as shown in FIG. 8, the input sequence includes an element 1 to an element 15, the first element is an intermediate element in the input sequence: the element 7, and the M windows used for performing self-attention calculation on the element 7 include a window 1 located before the element 7 and a window 2 located after the element 7. A dependency length between the element 7 and an element included in the window 1 is greater than 3 and less than 7, and a dependency length between the element 7 and an element included in the window 2 is also greater than 3 and less than 7.

Manner (4): When the first element is the 1st element in the input sequence, the M windows used for performing self-attention calculation on the first element are a plurality of windows located after the first element.

Manner (5): When the first element is the last element in the input sequence, the M windows used for performing self-attention calculation on the first element are a plurality of windows located before the first element.

It should be understood that any one of the manner (1), the manner (2), and the manner (3) may be combined with the manner (4) and the manner (5).

Optionally, in some embodiments, the M windows may further include a fourth window, and the fourth window includes the first element and the adjacent element of the first element.

Figure 9:
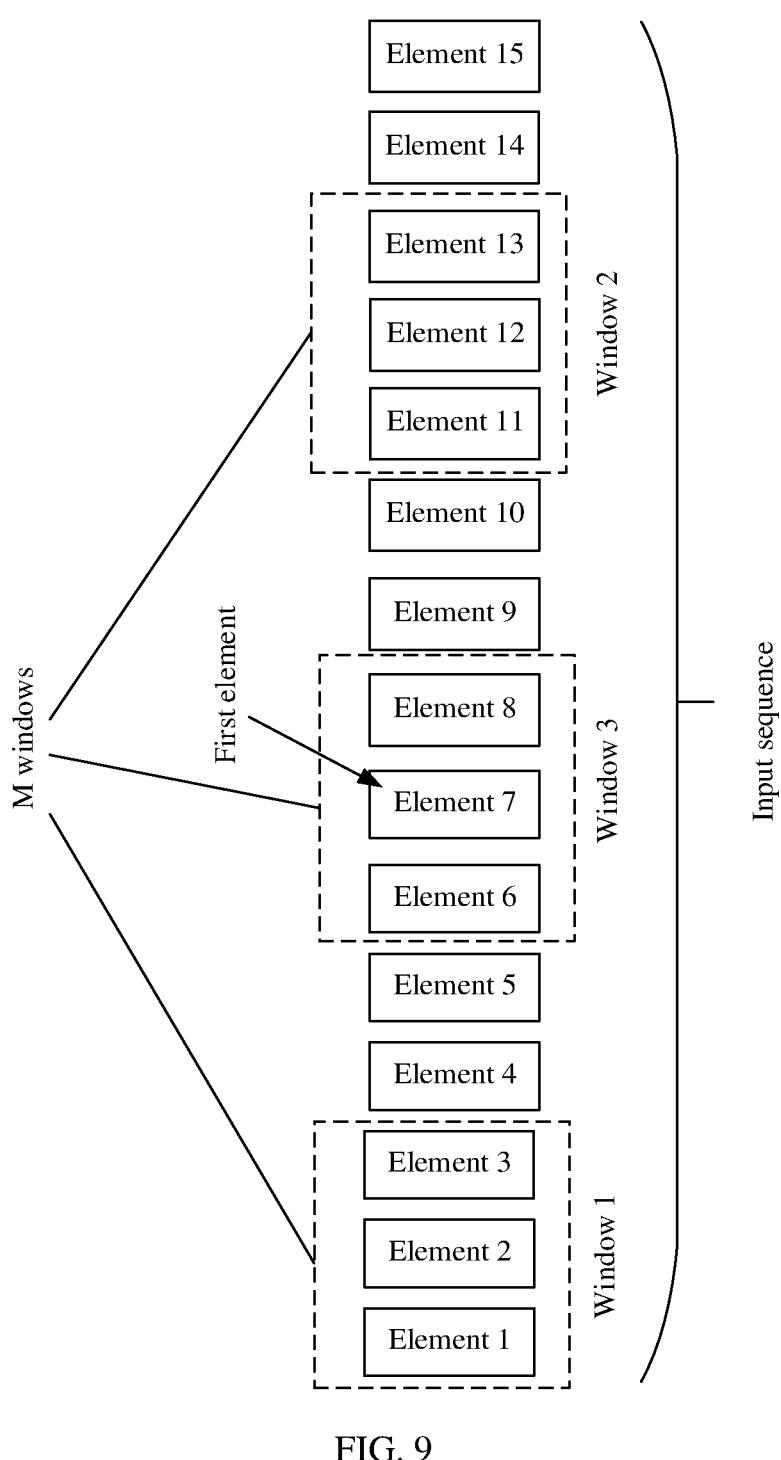

In an example, as shown in FIG. 9, the input sequence includes an element 1 to an element 15, the first element is an intermediate element in the input sequence: the element 7, and the M windows used for performing self-attention calculation on the element 7 not only include a window 1 and a window 2 that do not include the element 7 or an adjacent element of the element 7, but also include a window 3, where the window 3 includes the element 7 and adjacent elements of the element 7: the element 6 and the element 8.

In this embodiment of this application, for an element in the sequence, positions of a plurality of windows used for performing self-attention calculation on the element are determined based on a position of the element, so that a self-attention dependency range can be flexibly implemented.

Optionally, in some embodiments, the positions of the M windows may be alternatively preset. For example, the positions of the M windows may be irrelevant to the position of the first element. In an example, the input sequence is shown in FIG. 8. For each element in the input sequence, M windows used for performing self-attention calculation on the element are the window 1 and the window 2 shown in FIG. 8.

In the foregoing embodiments, FIG. 8 to FIG. 12 are used as examples for describing the M windows used for performing self-attention calculation on the first element in the sequence. It should be noted that FIG. 8 to FIG. 12 are merely examples but not limitations. In actual application, the value of M may be set based on an application requirement, to minimize a self-attention calculation amount; or a boundary of each of the M windows and an interval between different windows of the M windows may be set based on an application requirement, to implement an appropriate self-attention dependency range.

In this embodiment of this application, during self-attention calculation on an element in a sequence, calculation is performed by using elements in a plurality of windows. A quantity of the plurality of windows is irrelevant to a length of the sequence, and there is an interval between different windows. This can take a self-attention dependency range into account as far as possible while reducing a self-attention calculation amount, thereby achieving a balance between a self-attention calculation amount and a self-attention dependency range. In addition, positions of a plurality of windows used for performing self-attention calculation on a to-be-calculated element are determined based on a position of the element, so that a self-attention dependency range can be flexibly implemented.

In a scenario with a plurality of self-attention layers, with the method provided in this embodiment of this application, an upper self-attention layer may skip some elements that have been modeled by a preceding layer, thereby reducing a calculation amount.

Figures 13, 14:
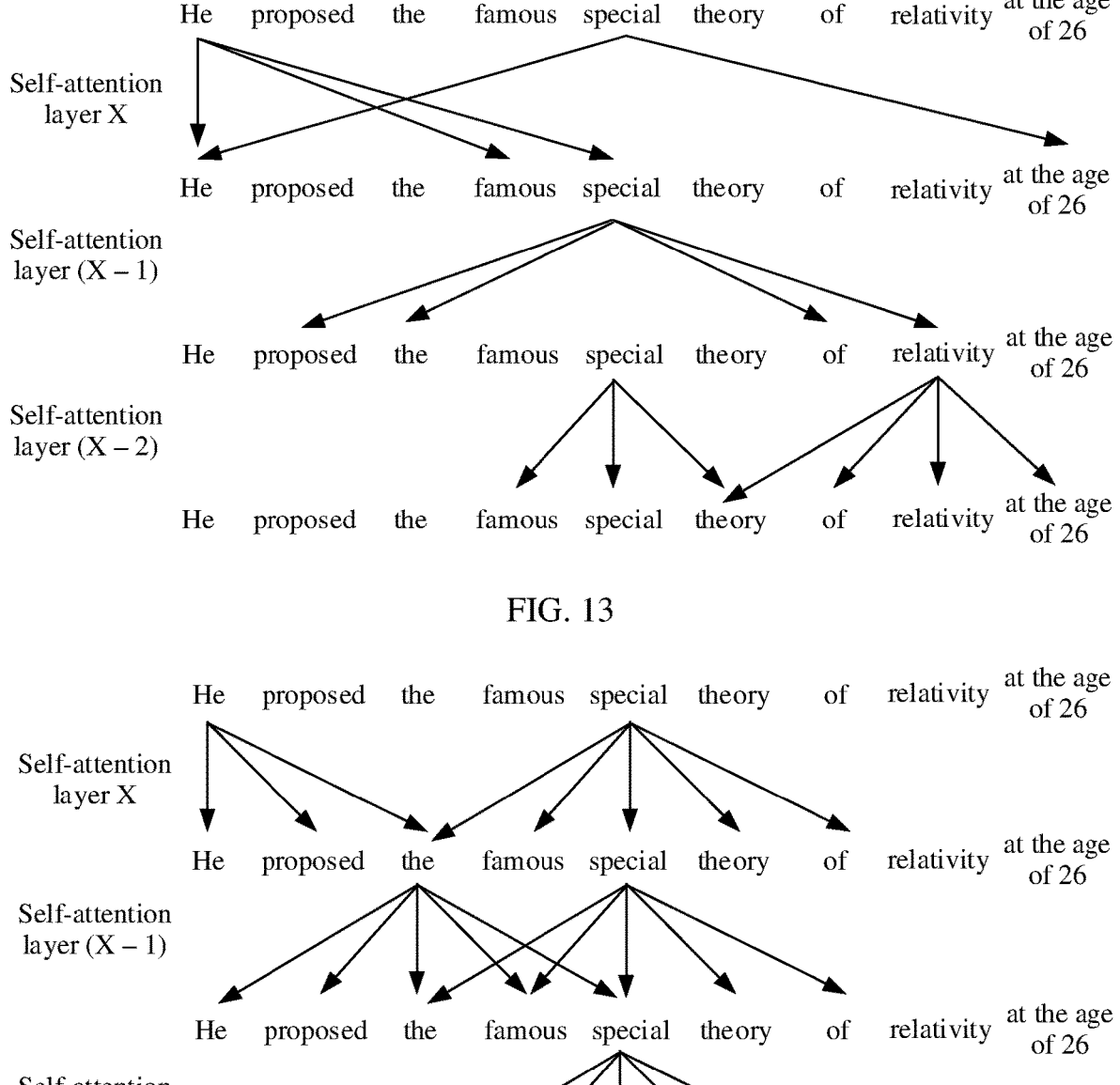
FIG. 13 is a schematic diagram of performing self-attention calculation on an element in a sequence when an embodiment of this application is applied to a scenario with a plurality of self-attention layers.
FIG. 14 is a schematic diagram of using a local self-attention mechanism in a scenario with a plurality of self-attention layers.

FIG. 13 and FIG. 14 show a case in which, in a scenario with three self-attention layers, self-attention calculation is performed on a same text sequence by using a self-attention mechanism provided in this embodiment of this application and by using the local self-attention shown in FIG. 3. In FIG. 13 and FIG. 14, a text sequence is "he proposed the famous special theory of relativity at the age of 26", and a self-attention layer (X−2) is a preceding layer of a self-attention layer (X−1), and the self-attention layer (X−1) is a preceding layer of a self-attention layer X.

FIG. 13 is a schematic diagram of performing self-attention calculation on a text sequence by using the self-attention mechanism provided in this embodiment of this application. Self-attention calculation on the element "special" is used as an example. At the self-attention layer (X−2), the elements "famous", "special", and "theory" are used for calculation. At the self-attention layer (X−1), the elements "proposed", "the", "of", and "relativity" are used for calculation. At the self-attention layer X, the elements "he", "at", "the", "age", "of", and "26" are used for calculation. It can be learned that, when the three self-attention layers separately perform self-attention calculation on the element "special", the self-attention layer (X−1) skips the elements already used at the self-attention layer (X−2) (the elements "famous", "special", and "theory"), and the self-attention layer X skips the elements already used at the self-attention layer (X−1) (the elements "proposed", "the", "of", and "relativity"). This can reduce a calculation amount.

Still as shown in FIG. 13, a relationship is established between two elements with a largest distance in the sequence: "he" and "26", through self-attention calculation performed by the self-attention layer (X−2) on the element "relativity", self-attention calculation performed by the self-attention layer (X−1) on the element "special", and self-attention calculation performed by the self-attention layer X on the element "he". In other words, a dependency with a length of 12 is implemented through processing by the three self-attention layers.

FIG. 14 is a schematic diagram of performing self-attention calculation on a text sequence by using the local self-attention mechanism shown in FIG. 3. Self-attention calculation on the element "special" is used as an example. At the self-attention layer (X−2), the elements "the", "famous", "special", "theory", and "of" are used for calculation. At the self-attention layer (X−1) and the self-attention layer X, the elements "the", "famous", "special", "theory", and "of" are still used for calculation. This leads to repeated calculation between a plurality of self-attention layers.

Still as shown in FIG. 14, a relationship is established only between the elements "he" and "of" in the sequence through self-attention calculation performed by the self-attention layer (X−2) on the element "special", self-attention calculation performed by the self-attention layer (X−1) on the element "the", and self-attention calculation performed by the self-attention layer X on the element "he". In other words, a dependency with a length of 6 is implemented through processing by the three self-attention layers.

It can be learned through comparison between FIG. 13 and FIG. 14 that, when processing is performed by a same quantity of self-attention layers, the self-attention mechanism provided in this embodiment of this application can model a dependency with a larger distance than that modeled by the conventional local self-attention mechanism.

The method for sequence processing according to this embodiment of this application may be applied to a speech processing system. For example, the speech processing system is a speech recognition system. For example, the input sequence in the method 400 provided in the foregoing embodiment is a speech sequence.

Alternatively, the method for sequence processing according to this embodiment of this application may be applied to a natural speech processing system. For example, the natural speech processing system is any one of the following systems: a translation system, and a natural language understanding (NLU) system based on a BERT model. For example, the input sequence in the method 400 provided in the foregoing embodiment is a speech sequence.

Embodiments described in this specification may be independent solutions, or may be combined based on internal logic. These solutions all fall within the protection scope of this application.

The foregoing describes method embodiments provided in this application, and the following describes apparatus embodiments provided in this application. It should be understood that descriptions of apparatus embodiments correspond to descriptions of method embodiments. Therefore, for content not described in detail, refer to the foregoing method embodiments. For brevity, details are not described herein again.

Figure 15:
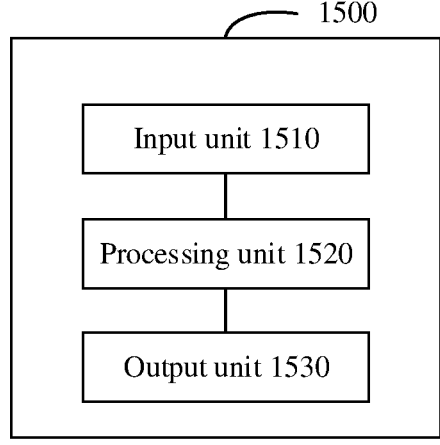
FIG. 15 is a schematic block diagram of an apparatus for sequence processing according to an embodiment of this application.

FIG. 15 is a schematic block diagram of an apparatus 1500 for sequence processing according to an embodiment of this application. The apparatus 1500 includes an input unit 1510, a processing unit 1520, and an output unit 1530.

The input unit 1510 is configured to receive an input sequence, and input the input sequence to the processing unit 1520, where the input sequence includes a plurality of elements in order.

The processing unit 1520 is configured to perform self-attention calculation on a first element in the input sequence by using an element included in M windows, to obtain a representation of the first element, where each of the M windows includes one element or a plurality of consecutive elements in the input sequence, there is an interval of at least one element between different windows, at least one of the M windows does not include the first element, and M is an integer greater than or equal to 1.

The output unit 1530 is configured to obtain, based on the representation of the first element, an output sequence corresponding to the input sequence Optionally, in some embodiments, the processing unit 1520 is further configured to: the processing unit is further configured to determine the M windows based on a position of the first element in the input sequence, where the M windows include a first window, the first window includes an element that is in the input sequence and whose dependency length from the first element is greater than or equal to a and is less than b, a is an integer greater than 1, b is an integer greater than a, and the dependency length indicates a distance between the first element and an element in the M windows.

Optionally, in some embodiments, the apparatus 1500 is applied to a plurality of self-attention layers, and the input sequence is a sequence output by a preceding self-attention layer of a current self-attention layer. The processing unit 1520 is further configured to determine the first window based on the position of the first element in the input sequence. The first window includes an element that is in the input sequence and whose dependency length from the first element is greater than or equal to a and is less than b, where values of b and a are set so that there is no repeated calculation between self-attention calculation performed by the current self-attention layer on the first element and self-attention calculation performed by the preceding self-attention layer on the first element.

Optionally, in some embodiments, the preceding self-attention layer performs self-attention calculation on the first element based on an element included in a fifth window, where the fifth window includes an element that is in the sequence and whose dependency length from the first element is greater than or equal to a1 and is less than b1, b1 is a positive integer, and a1 is a non-negative integer less than b1. The processing unit 1520 is further configured to determine the first window based on the position of the first element in the input sequence. The first window includes an element that is in the input sequence and whose dependency length from the first element is greater than or equal to a and is less than b, where a value of a is greater than a value of b1.

Optionally, in some embodiments, M is equal to 1, and the processing unit 1520 is configured to perform self-attention calculation on the first element in the input sequence by using the element included in the first window, to obtain the representation of the first element, where the first window includes one element or a plurality of consecutive elements in the input sequence, but does not include the first element.

Optionally, in some embodiments, M is greater than 1, and a value of M is preset.

Optionally, in some embodiments, the M windows include a second window and/or a third window.

For the second window, the second window includes an element that is located before the first element in the input sequence and whose dependency length from the first element is greater than or equal to a1 and is less than b1, where b1 is a positive integer, and a1 is a non-negative integer less than b1.

For the third window, the third window includes an element that is located after the first element in the input sequence and whose dependency length from the first element ment is greater than or equal to ar and is less than br, where br is a positive integer, and ar is a non-negative integer less than br.

Optionally, in some embodiments, the M windows further include a fourth window, and the fourth window includes the first element and an adjacent element of the first element.

Optionally, in some embodiments, the input sequence is a speech sequence or a text sequence.

The apparatus 1500 for sequence processing according to this embodiment of this application may also be referred to as a sequence processing apparatus. Optionally, the sequence processing apparatus may further include a processing module for another neural network layer.

Figure 16:
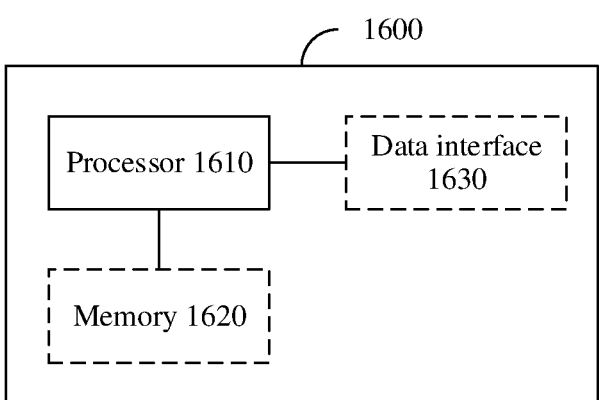
FIG. 16 is another schematic block diagram of an apparatus for sequence processing according to an embodiment of this application.

As shown in FIG. 16, an embodiment of this application further provides an apparatus 1600 for sequence processing. The apparatus 1600 includes a processor 1610. The processor 1610 is coupled to a memory 1620. The memory 1620 is configured to store a computer program or instructions. The processor 1610 is configured to execute the computer program or the instructions stored in the memory 1620, so that the methods in the foregoing method embodiments are performed.

Optionally, as shown in FIG. 16, the apparatus 1600 may further include the memory 1620.

Optionally, as shown in FIG. 16, the apparatus 1600 may further include a data interface 1630, and the data interface 1630 is configured to perform data transmission with the outside.

Figure 17:
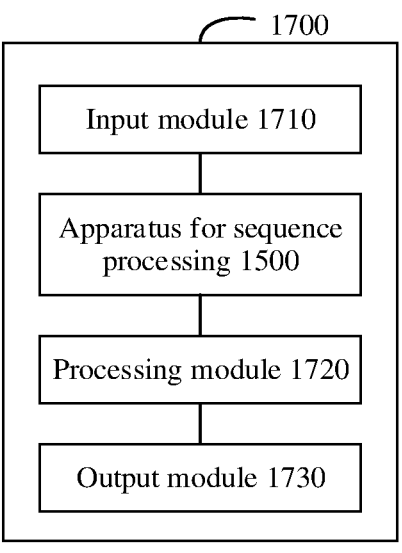
FIG. 17 is a schematic block diagram of a neural network processing apparatus according to an embodiment of this application.

As shown in FIG. 17, an embodiment of this application further provides a neural network processing apparatus 1700, including an input module 1710, a processing module 1720, an output module 1730, and the apparatus 1500 for sequence processing according to an embodiment of this application.

The input module 1710 is configured to transmit a to-be-processed input sequence to the apparatus 1500 for sequence processing.

Optionally, the input module 1710 may further include a feature extraction unit, configured to extract feature data from to-be-processed data, where the feature data is used as input for the apparatus 1500 for sequence processing.

The apparatus 1500 for sequence processing is configured to perform self-attention calculation on the input sequence, to obtain an output sequence corresponding to the input sequence.

The processing module 1720 is configured to process the output sequence obtained by the apparatus 1500, to obtain a sequence processing result.

The output module 1730 is configured to output an output signal based on the sequence processing result obtained by the processing module 1720.

Optionally, in some embodiments, the input module 1710 is configured to transmit a speech sequence to the apparatus 1500 for sequence processing, and the processing module 1720 is configured to perform speech recognition processing on the output sequence obtained by the apparatus 1500 for sequence processing, to obtain a speech recognition result.

In this embodiment, the neural network processing apparatus 1700 may be referred to as a speech processing system.

Optionally, in some embodiments, the input module 1710 is configured to transmit a text sequence to the apparatus 1500 for sequence processing, and the processing module 1720 is configured to perform semantic understanding processing on the output sequence obtained by the apparatus 1500 for sequence processing, to obtain a semantic understanding result.

In this embodiment, the neural network processing apparatus 1700 may be referred to as a natural language processing system.

An efficient sequence data processing system may be constructed by combining another type of neural network layer with a self-attention layer in which the self-attention mechanism provided in embodiments of this application is used.

Figure 18:
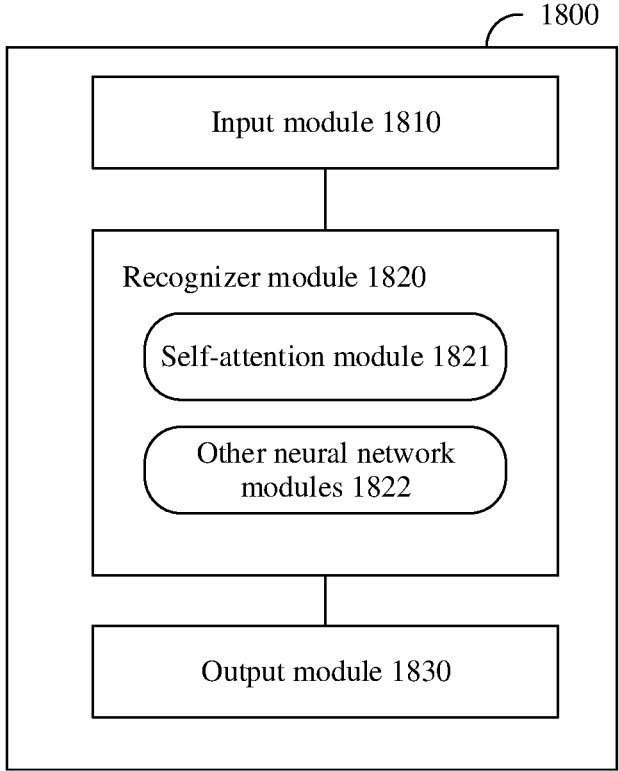
FIG. 18 is a schematic block diagram of a speech recognition system according to an embodiment of this application.

FIG. 18 is a schematic block diagram of a speech recognition system 1800 to which an embodiment of this application may be applied. The speech recognition system 1800 may be configured to perform real-time speech recognition. The speech recognition system 1800 includes an input module 1810, a recognizer module 1820, and an output module 1830. The recognizer module 1820 is a neural network including a self-attention layer. At least one self-attention layer included in the recognizer module 1820 processes an input sequence by using the self-attention mechanism provided in embodiments of this application, that is, the method 400 provided in the foregoing embodiment.

The input module 1810 is configured to receive to-be-processed data, and obtain input, namely, an input sequence, for the recognizer module 1820 based on the to-be-processed data.

For example, the input module 1810 may include an acoustic feature extraction unit. The acoustic feature extraction unit is configured to perform feature extraction on the to-be-processed data that is input, to obtain feature data. The feature data extracted by the acoustic feature extraction unit is the input for the recognizer module 1820.

The recognizer module 1820 is configured to perform speech recognition processing on the sequence input by the input module 1810, to obtain a speech recognition result. The recognizer module 1820 includes a self-attention module 1821 and other neural network modules 1822.

For example, the self-attention module 1821 includes the following structures: a batch normalization layer, a self-attention layer, a residual connection, and an FFN layer. At least one self-attention layer included in the self-attention module 1821 processes the input sequence by using the self-attention mechanism provided in embodiments of this application, that is, the method 400 provided in the foregoing embodiment.

The residual connection is a neural network connection mode, and usually means that a sum of output of a current layer and output of a preceding layer is used as output. Batch normalization is a method for normalizing an intermediate value of a neural network. The FFN layer is, for example, a position-wise FFN. The position-wise FFN means that a same FFN is used for all positions in a sequence. The FFN has two layers. An activation function for a first layer is ReLU, and a second layer does not have an activation function. The ReLU is an activation function for a neural network. For example, a calculation method of the ReLU is as follows: $y=\max(x, 0)$, where x indicates input, and y indicates output.

For example, the self-attention module 1821 may be stacked N times.

The other neural network modules 1822 may include a convolution block (Convolution block). For example, the convolution block may be repeatedly stacked M times.

For example, the other neural network modules 1822 may be a ConvBlock. The ConvBlock is a structure obtained by splicing a convolution layer, a batch normalization layer, and then a ReLU.

For example, the recognizer module 1820 may also be stacked K times.

The convolution layer, the batch normalization layer, the FFN, and the ReLU are all common structural components of a neural network. Details are not described in this application.

The output module 1830 is configured to output an output signal based on the speech recognition result obtained by the recognizer module 1820. For example, the output signal is a character sequence.

Optionally, the output module 1830 includes the following structures: layer normalization (layer normalization layer norm) and an output feedforward neural network (output ffn).

The feedforward neural network (FFN) is a type of neural network. For example, a calculation process of a single-layer FFN may be expressed as follows: $y=\text{act}(Wx+b)$, where x indicates input feature data, y indicates output feature data, W and b indicate parameters, and act( ) indicates an activation function.

It should be understood that, because the self-attention mechanism provided in embodiments of this application is used in the speech recognition system 1800 provided in this embodiment of this application, a self-attention calculation amount can be reduced, and a self-attention dependency range can also be ensured, thereby implementing efficient processing of sequence data.

An embodiment of this application further provides a computer-readable medium. The computer-readable medium stores program code to be executed by a device. The program code is used for performing the methods in the foregoing embodiments.

An embodiment of this application further provides a computer program product including instructions. When the computer program product runs on a computer, the computer is enabled to perform the methods in the foregoing embodiments.

An embodiment of this application further provides a chip. The chip includes a processor and a data interface. The processor reads, by using the data interface, instructions stored in a memory, to perform the methods in the foregoing embodiments.

Optionally, in an implementation, the chip may further include a memory. The memory stores instructions. The processor is configured to execute the instructions stored in the memory. When the instructions are executed, the processor is configured to perform the methods in the foregoing embodiments.

Figure 19:
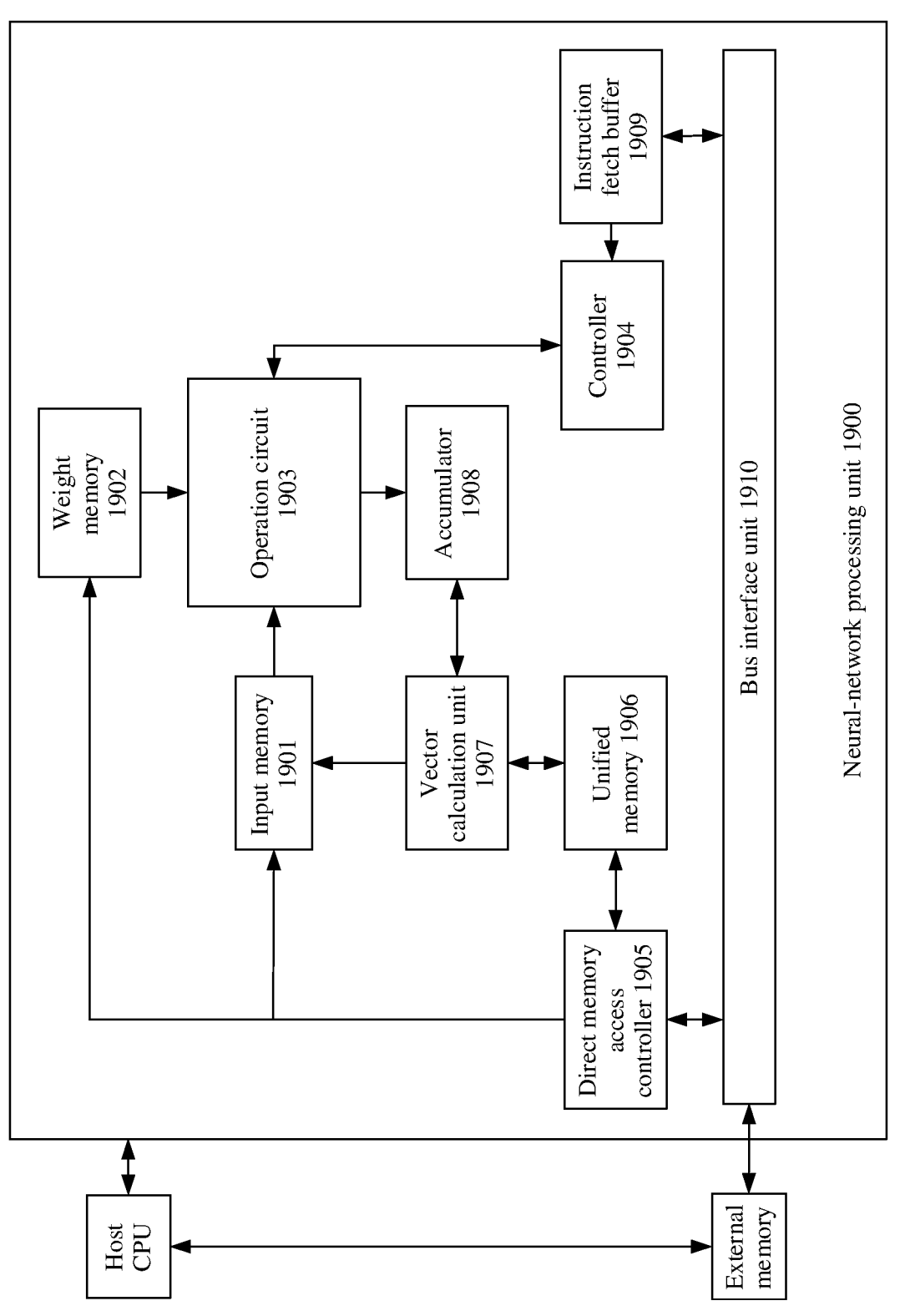
FIG. 19 is a schematic diagram of a hardware structure of a chip according to an embodiment of this application.

FIG. 19 shows a hardware structure of a chip according to an embodiment of this application. The chip includes a neural-network processing unit 1900. The chip may be disposed in any one or more of the following apparatuses:

the apparatus 1500 shown in FIG. 15, the apparatus 1600 shown in FIG. 16, the apparatus 1700 shown in FIG. 17, and the apparatus 1800 shown in FIG. 18.

The method 400 in the foregoing method embodiment may be implemented in the chip shown in FIG. 19.

The neural-network processing unit 1900 is mounted to a host CPU as a coprocessor, and the host CPU allocates a task. A core part of the neural-network processing unit 1900 is an operation circuit 1903. A controller 1904 controls the operation circuit 1903 to obtain data in a memory (a weight memory 1902 or an input memory 1901) and perform an operation.

In some implementations, the operation circuit 1903 includes a plurality of processing elements (process engine, PE). In some implementations, the operation circuit 1903 is a two-dimensional systolic array. Alternatively, the operation circuit 1903 may be a one-dimensional systolic array or another electronic circuit capable of performing mathematic operations such as multiplication and addition. In some implementations, the operation circuit 1903 is a general-purpose matrix processor.

For example, it is assumed that there are an input matrix A, a weight matrix B, and an output matrix C. The operation circuit 1903 obtains data corresponding to the matrix B from the weight memory 1902, and buffers the data to each PE in the operation circuit 1903. The operation circuit 1903 obtains data of the matrix A from the input memory 1901, and performs a matrix operation on the matrix B and the data of the matrix A. Partial results or final results of a matrix that are obtained are stored in an accumulator 1908.

A vector calculation unit 1907 may perform further processing, for example, vector multiplication, vector addition, an exponential operation, a logarithm operation, or a magnitude comparison, on output of the operation circuit 1903. For example, the vector calculation unit 1907 may be used for network calculation, for example, pooling, batch normalization, or local response normalization, at a non-convolution/non-FC layer of a neural network.

In some implementations, the vector calculation unit 1907 can store a vector of processed output to a unified memory (which may also be referred to as a unified buffer) 1906. For example, the vector calculation unit 1907 may apply a non-linear function to output of the operation circuit 1903, for example, a vector of an accumulated value, to generate an activation value. In some implementations, the vector calculation unit 1907 generates a normalized value, a combined value, or both. In some implementations, the vector of the processed output can be used as activation input to the operation circuit 1903, for example, for use at a subsequent layer of the neural network. The method 400 in the foregoing method embodiment may be performed by 1903 or 1907.

The unified memory 1906 is configured to store input data and output data.

A direct memory access controller (DMAC) 1905 may transfer input data in an external memory to the input memory 1901 and/or the unified memory 1906, store weight data in the external memory to the weight memory 1902, and store data in the unified memory 1906 to the external memory.

A bus interface unit (BIU) 1910 is configured to implement interaction between the host CPU, the DMAC, and an instruction fetch buffer 1909 through a bus.

The instruction fetch buffer 1909 connected to the controller 1904 is configured to store instructions to be used by the controller 1904.

The controller 1904 is configured to invoke the instructions buffered in the instruction fetch buffer 1909, to control an operating process of the operation accelerator.

Usually, the unified memory 1906, the input memory 1901, the weight memory 1902, and the instruction fetch buffer 1909 are all on-chip memories, and the external memory is an external memory of the NPU. The external memory may be a double data rate synchronous dynamic random access memory (DDR SDRAM), a high bandwidth memory (HBM), or another readable and writable memory.

Unless otherwise defined, all technical and scientific terms used in this specification have same meanings as those usually understood by a person skilled in the art of this application. Terms used in this specification of this application are merely intended to describe specific embodiments, but not to limit this application.

It should be noted that various numbers such as the first or the second in this specification are merely used for differentiation for ease of description, and are not intended to limit the scope of embodiments of this application.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, for example, a universal serial bus flash disk (USB flash disk, UFD) (the UFD may also be referred to as a USB flash drive or a USB drive), a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for sequence processing, comprising:
receiving an input sequence, wherein the input sequence comprises a plurality of elements in order;
determining M windows based on a position of a first element in the input sequence, to balance a self-attention calculation amount and a self-attention dependency range;
performing, by at least one processor executing a neural network comprising one or more self-attention layers, self-attention calculation on the first element in the input sequence by using a respective element from each of the M windows, to obtain a representation of the first element, wherein each of the M windows comprises one element or a plurality of consecutive elements in the input sequence, there is an interval of at least one element between different windows of the M windows, at least one of the M windows does not include the first element, and M is an integer greater than 1; and
obtaining, based on the representation of the first element, an output sequence corresponding to the input sequence.

2. The method according to claim 1, wherein
the M windows comprise a first window, the first window comprises an element that is in the input sequence and whose dependency length from the first element is greater than or equal to a and is less than b, a is an integer greater than 1, b is an integer greater than a, and the dependency length indicates a distance between the first element and an element in the M windows.

3. The method according to claim 2, wherein the method is applied to a plurality of self-attention layers comprising at least a current self-attention layer and a preceding self-attention layer that precedes the current self-attention layer, and the input sequence is a sequence that is output by the preceding self-attention layer and is input to the current self-attention layer, wherein
values of b and a are set so that there is no repeated calculation between self-attention calculation performed for the current self-attention layer on the first element and self-attention calculation performed for the preceding self-attention layer on the first element.

4. The method according to claim 3, wherein the preceding self-attention layer performs self-attention calculation on the first element based on an element comprised in a second window, wherein the second window comprises an element that is in the input sequence and whose dependency length from the first element is greater than or equal to a1 and is less than b1, wherein b1 is a positive integer, and a1 is a non-negative integer less than b1; and
a value of a is greater than a value of b1.

5. The method according to claim 1, wherein a value of M is preset.

6. The method according to claim 5, wherein the M windows comprise:
a second window, wherein the second window comprises an element that is located before the first element in the input sequence; and/or a third window, wherein the third window comprises an element that is located after the first element in the input sequence.

7. The method according to claim 5, wherein the M windows comprise a fourth window, and the fourth window comprises the first element and an adjacent element of the first element.

8. The method according to claim 1, wherein the input sequence is a speech sequence or a text sequence.

9. A data processing apparatus, comprising:
a memory, configured to store executable instructions; and
a processor, configured to invoke and run the executable instructions stored in the memory, to perform operations comprising:
receiving an input sequence, wherein the input sequence comprises a plurality of elements in order;
determining M windows based on a position of a first element in the input sequence, to balance a self-attention calculation amount and a self-attention dependency range;
performing, by executing a neural network comprising one or more self-attention layers, self-attention calculation on the first element in the input sequence by using a respective element from each of the M windows, to obtain a representation of the first element, wherein each of the M windows comprises one element or a plurality of consecutive elements in the input sequence, there is an interval of at least one element between different windows of the M windows, at least one of the M windows does not include the first element, and M is an integer greater than 1; and
obtaining, based on the representation of the first element, an output sequence corresponding to the input sequence.

10. The apparatus according to claim 9, wherein
the M windows based on a position of the first element in the input sequence, wherein the M windows comprise a first window, the first window comprises an element that is in the input sequence and whose dependency length from the first element is greater than or equal to a and is less than b, a is an integer greater than 1, b is an integer greater than a, and the dependency length indicates a distance between the first element and an element in the M windows.

11. The apparatus according to claim 10, wherein the apparatus is applied to a plurality of self-attention layers comprising at least a current self-attention layer and a preceding self-attention layer that precedes the current self-attention layer, and the input sequence is a sequence that is output by the preceding self-attention layer and is input to the current self-attention layer, wherein
values of b and a are set so that there is no repeated calculation between self-attention calculation performed by the current self-attention layer on the first element and self-attention calculation performed by the preceding self-attention layer on the first element.

12. The apparatus according to claim 11, wherein the preceding self-attention layer performs self-attention calculation on the first element based on an element comprised in a second window, wherein the second window comprises an element that is in the input sequence and whose dependency length from the first element is greater than or equal to a1 and is less than b1, wherein b1 is a positive integer, and a1 is a non-negative integer less than b1; and
a value of a is greater than a value of b1.

13. The apparatus according to claim 9, wherein a value of M is preset.

14. The apparatus according to claim 11, wherein the M windows comprise:

a second window, wherein the second window comprises an element that is located before the first element in the input sequence; and/or a third window, wherein the third window comprises an element that is located after the first element in the input sequence.

15. A non-transitory computer-readable storage medium storing program instructions that when executed by a processor, causes the processor to perform operations comprising:

receiving an input sequence, wherein the input sequence comprises a plurality of elements in order;

determining M windows based on a position of a first element in the input sequence, to balance a self-attention calculation amount and a self-attention dependency range;

performing, by the processor executing a neural network comprising one or more self-attention layers, self-attention calculation on the first element in the input sequence by using a respective element from each of the M windows, to obtain a representation of the first element, wherein each of the M windows comprises one element or a plurality of consecutive elements in the input sequence, there is an interval of at least one element between different windows of the M window, at least one of the M windows does not include the first element, and M is an integer greater than 1; and obtaining, based on the representation of the first element, an output sequence corresponding to the input sequence.

16. The computer-readable storage medium according to claim 15, wherein the M windows comprise a first window, the first window comprises an element that is in the input sequence and whose dependency length from the first element is greater than or equal to a and is less than b, a is an integer greater than 1, b is an integer greater than a, and the dependency length indicates a distance between the first element and an element in the M windows.

17. The computer-readable storage medium according to claim 16, wherein the computer-readable storage medium is applied to a plurality of self-attention layers comprising at least a current self-attention layer and a preceding self-attention layer that precedes the current self-attention layer, and the input sequence is a sequence that is output by the preceding self-attention layer and is input to the current self-attention layer, wherein values of b and a are set so that there is no repeated calculation between self-attention calculation performed for the current self-attention layer on the first element and self-attention calculation performed for the preceding self-attention layer on the first element.

18. The computer-readable storage medium according to claim 17, wherein the preceding self-attention layer performs self-attention calculation on the first element based on an element comprised in a second window, wherein the second window comprises an element that is in the sequence and whose dependency length from the first element is greater than or equal to a1 and is less than b1, b1 is a positive integer, and a1 is a non-negative integer less than b1; and a value of a is greater than a value of b1.

19. The computer-readable storage medium according to claim 15, wherein a value of M is preset.

20. The computer-readable storage medium according to claim 19, wherein the M windows comprise:

a second window, wherein the second window comprises an element that is located before the first element in the input sequence; and/or a third window, wherein the third window comprises an element that is located after the first element in the input sequence.

* * * * *